US006023283A

United States Patent [19]

Imai

[11] Patent Number: 6,023,283

[45] Date of Patent: Feb. 8, 2000

[54] METHOD OF AND APPARATUS FOR RECORDING AN IMAGE IN A THERMOSETTING MEDIUM WITH POST-RECORDING HEAT TREATMENT

[75] Inventor: Shinji Imai, Kanagawa-ken, Japan

[73] Assignee: Fuji Photo Film Co., Ltd., Kanagawa-Ken, Japan

[21] Appl. No.: 08/954,745

[22] Filed: Oct. 20, 1997

Related U.S. Application Data

[63] Continuation-in-part of application No. 08/314,221, Sep. 28, 1994, abandoned.

[30] Foreign Application Priority Data

Sep. 28, 1993 [JP] Japan .................................... 5-241827

[51] Int. Cl.[7] ............................ B41J 2/315; G01D 15/10

[52] U.S. Cl. .......................................................... 347/212

[58] Field of Search .................................... 347/172, 183, 347/184, 186, 187, 212, 185; 400/120.08, 120.13, 120.18; 399/33, 320, 330, 335, 364, 398; 346/25

[56] References Cited

U.S. PATENT DOCUMENTS

| | | | |
|---|---|---|---|
| 4,893,190 | 1/1990 | Takanashi et al. | 347/184 |
| 5,179,391 | 1/1993 | Miyazaki | 347/212 |
| 5,410,335 | 4/1995 | Sawano et al. | 347/172 |
| 5,459,562 | 10/1995 | Mitsuya et al. | 399/364 |

FOREIGN PATENT DOCUMENTS

| | | | |
|---|---|---|---|
| 57-47694 | 3/1982 | Japan | 347/187 |
| 156274 | 9/1982 | Japan | 347/187 |
| 59-98878 | 6/1984 | Japan . | |
| 61-16870 | 1/1986 | Japan | 347/272 |
| 2000538 | 1/1990 | Japan | 347/187 |
| 480052 | 3/1992 | Japan | 347/187 |
| 532042 | 2/1993 | Japan . | |

OTHER PUBLICATIONS

IBM Technical Disclosure Bulletin "Superthreshold Impact Heat Printing", M.P. Prater, vol. 1, No. 6 Apr. 1959.

*Primary Examiner*—Huan Tran
*Assistant Examiner*—L. Anderson
*Attorney, Agent, or Firm*—Sughrue, Mion, Zinn, Macpeak & Seas, PLLC

[57] ABSTRACT

A thermosensitive recording medium is preheated to a temperature beyond which the thermosensitive recording medium produces color by a heat roller which is held in contact with the thermosensitive recording medium. Then, thermal energy according to an image to be recorded is applied to the preheated thermosensitive recording medium by a thermal head, thereby recording a gradation image on the thermosensitive recording medium. Thereafter, the thermosensitive recording medium is heated again, substantially uniformly over the entire surface thereof, by a heat source for stabilizing the color density of the recorded image.

20 Claims, 21 Drawing Sheets

METHOD OF AND APPARATUS FOR RECORDING AN IMAGE IN A THERMOSETTING MEDIUM WITH POST-RECORDING HEAT TREATMENT

This is a continuation-in-part of application Ser. No. 08/314,221, filed Sep. 28, 1994, now abandoned.

BACKGROUND OF THE INVENTION

1. Field of the Invention

The present invention relates to a method of and an apparatus for thermally recording an image or the like by recording an image or like on a thermosensitive recording medium with thermal energy applied from a thermal head and thereafter heating the thermosensitive recording medium again to produce an image of stable density.

2. Description of the Related Art

There have been widely used thermal recording apparatus for applying thermal energy to a thermosensitive recording medium to record an image or the like on the thermosensitive recording medium. Particularly, a small-size thermal recording apparatus employing a thermal head as a heat source is known from Japanese Laid-Open Patent Publication No. 59-98878, for example. Thermosensitive recording mediums for directly recording images thereon in such thermal recording apparatus include leuco thermosensitive recording paper and diazo thermosensitive recording paper. Thermosensitive recording mediums for recording images thereon through thermal transfer include sublimation-transfer thermosensitive recording paper. Further, transparent thermally sensitive recording media are being developed, whereby digital images produced by electronic medical apparatus, for example ultrasonic scanners, CT scanners, X-ray apparatus and so forth, can be directly recorded onto such recording media.

Such thermosensitive recording mediums are designed not to produce color with low thermal energy so that they can be kept in stable storage. Therefore, a considerable amount of thermal energy needs to be applied to a thermosensitive recording medium in order to cause the thermosensitive recording medium to develop a desired color. As a result, the dynamic range of image information that can be recorded on the thermosensitive recording medium is reduced by a threshold of thermal energy that must be exceeded to produce color. The reduced dynamic range makes it difficult to obtain high-gradation images recorded on the thermosensitive recording medium, and imposes a considerably large burden on thermal recording apparatus to produce color on the thermosensitive recording medium.

When a certain level of thermal energy is applied to a thermosensitive recording medium, the thermosensitive recording medium produces color depending on the applied level of thermal energy to visualize a desired image on the thermosensitive recording medium. It is known that the density of a recorded image increases with time when a thermosensitive recording medium is kept in storage at normal temperature after the image has been recorded on the thermosensitive recording medium. Consequently, the density of the image a certain period of time after it is recorded is different from the density of the same image immediately after it is recorded.

In particular, in high heat conditions such as inside an automobile in the summer, even in a short period of just a few minutes, the image density can become highly increased. Further, with images produced using the aforementioned medical treatment devices, the thermal stability, and stability over time, of the recorded image density becomes an extremely vital factor.

Herein, a prior art technique exists as disclosed in Japanese Laid-Open Patent Publication No. 61-16870, in which after thermal energy has been applied to a thermally sensitive material for producing color thereon corresponding to image information, radiant heat is radiated toward the heat sensitive recording medium, for a short time period and in a non-contacting manner, whereby heat or light is absorbed by only the image-containing portions, for raising the density thereof, whilst production of color in the non-image portions is suppressed. In this case, the density of image-containing portions with developed color therein is raised, by absorbing a heat energy which exceeds the energy needed to produce color, and on the other hand, the non-image portions which lack developed color therein, do not absorb heat or light, and since the temperature rise in those parts is kept low, color development is suppressed.

In the prior art technique, as a result of the enhancement in contrast between the image and non-image portions, the image density is improved. Nevertheless, an improvement in accuracy and/or stability of preservation of the image density cannot be assured. For example, as a result of applying radiant heat to the image-containing portions, which exceeds the heat energy required for producing color, there is the fear that an image having a density which is greater than desirable could be produced. In particular, if the time at which the radiant heat is irradiated becomes prolonged, the amount of heat energy absorbed by the thermal recording medium also increases, so that unless the intensity of illumination and/or the irradiation time of the radiant heat is very tightly controlled, a stable image density cannot be obtained. Further, were the heat source to comprise a heat roller or the like, by which direct contact with the thermally sensitive medium is made, then heat energy exceeding that required for color development would likewise be applied to the non-image portions as well, causing color development in such regions; and hence, heat cannot be selectively applied to the image-containing portions only, as required of the prior art. Accordingly, the prior art technique is limited to use with a non-contacting type of heat source.

SUMMARY OF THE INVENTION

It is therefore an object of the present invention to provide a method of and an apparatus for recording an image to stabilize the density of a recorded image, achieve a sufficient dynamic range for a thermal head used to record an image for obtaining a highly accurate high-gradation image, and minimize a burden on the thermal head for simplifying and making the apparatus inexpensive.

To achieve the above object, there is provided in accordance with the present invention a method of thermally recording an image on a thermosensitive recording medium which produces color with a density depending on thermal energy applied thereto, comprising the steps of: thermally recording an image on the thermosensitive recording medium with a thermal head which generates heat according to information of the image to be recorded; and applying substantially uniformly over the entire surface of the thermosensitive recording medium on which the image has been recorded a quantity of thermal energy less than a coloring thermal energy of the thermosensitive recording medium.

According to the present invention, there is also provided a method of thermally recording an image on a thermosensitive recording medium which produces color with a density depending on thermal energy applied thereto, comprising the steps of: preheating the thermosensitive recording medium by applying substantially uniformly over the entire surface thereof a quantity of thermal energy less than a coloring thermal energy of the thermosensitive recording medium; thermally recording an image on the preheated thermosensitive recording medium with a thermal head which generates heat according to information of the image to be recorded; and applying substantially uniformly over the entire surface of the thermosensitive recording medium on which the information has been recorded a quantity of thermal energy less than the coloring thermal energy of the thermosensitive recording medium.

According to the present invention, there is further provided an apparatus for thermally recording an image on a thermosensitive recording medium which produces color with a density depending on thermal energy applied thereto, comprising: a thermal head which generates heat according to information of an image to be recorded for thermally recording the image on the thermosensitive recording medium; and post-recording heating means for applying substantially uniformly over the entire surface thereof a quantity of thermal energy less than a coloring thermal energy of the thermosensitive recording medium, after recording the image thereon.

According to the present invention, there is further provided an apparatus for thermally recording an image on a thermosensitive recording medium which produces color with a density depending on thermal energy applied thereto, comprising: preheating means for applying substantially uniformly over the entire surface thereof a quantity of thermal energy less than a coloring thermal energy of the thermosensitive recording medium thereto; a thermal head which generates heat according to information of an image to be recorded for thermally recording the image on the thermosensitive recording medium; and post-recording heating means for applying substantially uniformly over the entire surface thereof a quantity of thermal energy less than a coloring thermal energy of the thermosensitive recording medium, after recording the image thereon.

According to the present invention, there is further provided an apparatus for thermally recording an image on a thermosensitive recording medium which includes a thermosensitive layer for producing color with a density depending on thermal energy applied thereto and an electrically conductive heating layer disposed therein, comprising: a thermal head which generates heat according to information of an image to be recorded for thermally recording the image on the thermosensitive recording medium; and post-recording heating means for applying substantially uniformly over the entire surface thereof a quantity of thermal energy less than a coloring thermal energy of the thermosensitive recording medium, by supplying an electric current to said electrically conductive heating layer of the thermosensitive recording medium, after recording the image thereon.

With the above arrangement, thermal energy is applied from the thermal head which generates heat according to information of an image to be recorded to the thermosensitive recording medium which produces color with a density depending on thermal energy applied thereto. Thus a visible image is recorded on the thermosensitive recording medium. Thereafter, the thermosensitive recording medium is heated again, substantially uniformly over the entire surface thereof, with a quantity of thermal energy less than a coloring thermal energy of the thermosensitive recording medium to promote the color producing reaction therein for recording an image of stable density. Before the visible image is recorded on the thermosensitive recording medium by the thermal head, the thermosensitive recording medium is preheated, substantially uniformly over the entire surface thereof, with thermal energy less than the coloring thermal energy. Since the thermosensitive recording medium is preheated, the thermal head is not required to have a high output power requirement and can maintain a sufficient dynamic range for recording high-gradation images on the thermosensitive recording medium. The apparatus is relatively simple in structure and relatively inexpensive to manufacture.

Further, because the temperature of the heat, which is reapplied after the visible image has been recorded, is less than that required for producing color, even if the temperature Is only roughly controlled, an image having sufficiently stable density can still be obtained.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
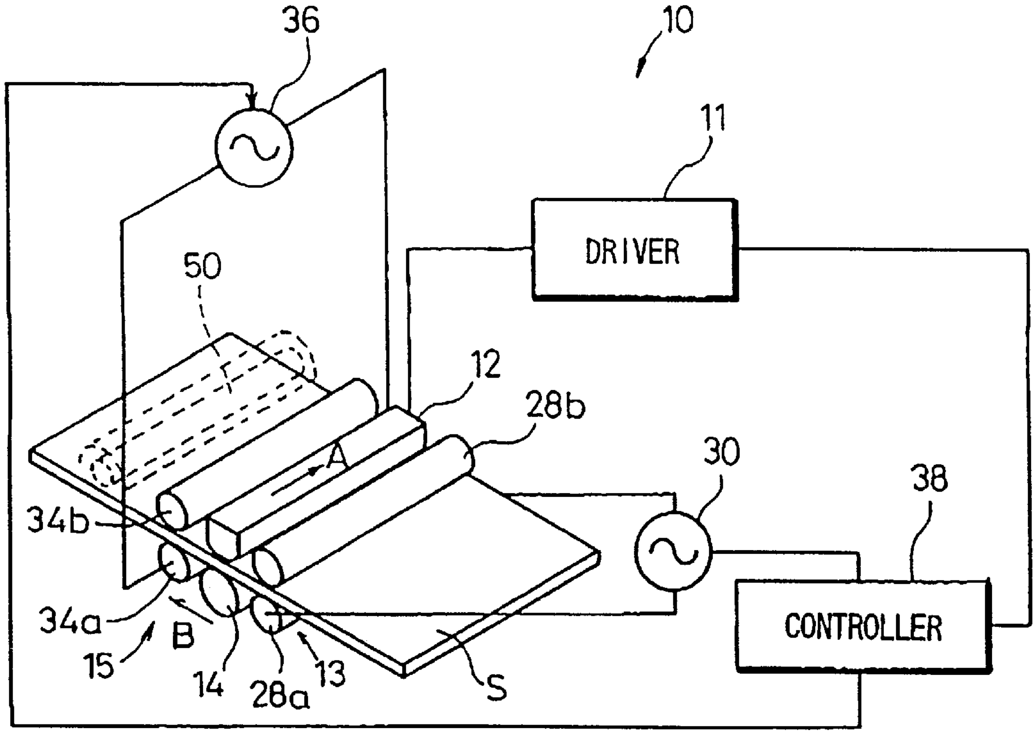
FIG. 1 is a schematic perspective view, partly in block form, of a thermal recording apparatus according to an embodiment of the present invention.

Like or corresponding parts are denoted by like or corresponding reference numerals throughout the views.

In various embodiments described below, a thermal head is controlled to record an image or the like in multiple gradations on a thermosensitive recording medium.

The thermosensitive recording medium employed in the embodiments described below may comprise one in which, for example, after a coloring agent which is encapsulated within microcapsules, and a developing agent which is isolated from the coloring agent by said microcapsules are dissolved in an organic solvent, a coating liquid containing an emulsifier dispersion is coated on a support body (See, Japanese Laid-Open Patent Publication No. 5-32042). In this case, corresponding to an externally supplied heat energy, the material permeability of the microcapsules is increased on the thermosensitive recording medium, whilst the flowability of the developing agent likewise is caused to increase and come into contact with the coloring agent, wherein due to this reaction, color development at a fixed density occurs.

Figure 2:
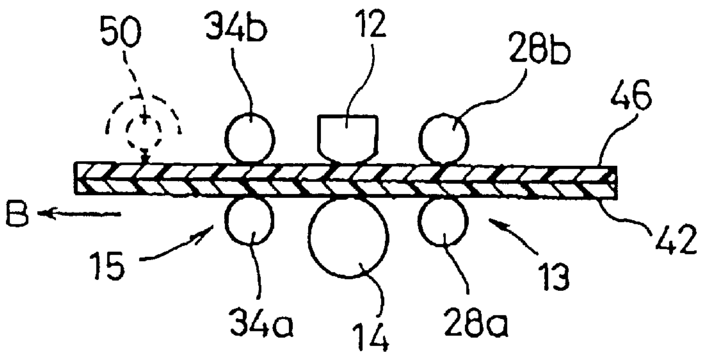
FIG. 2 is a side elevational view of a portion of the thermal recording apparatus shown in FIG. 1.

A thermal recording apparatus 10 shown in FIG. 1 records an image or the like on a thermosensitive recording medium S fed in the direction indicated by the arrow B by applying thermal energy from a thermal head 12 to the thermosensitive recording medium S which is held against the thermal head 12. The thermal recording apparatus 10 essentially comprises a driver 11 for energizing the thermal head 12, which is composed of an array of resistive heating elements in the direction indicated by the arrow A, depending on the density of an image or the like to be recorded, a preheater 13 disposed upstream of the thermal head 12 with respect to the direction B, and a post-recording heater 15 disposed downstream of the thermal head 12 with respect to the direction B (see also FIG. 2). The thermosensitive recording medium S is gripped between the thermal head 12 and a platen roller 14. The preheater 13 comprises a pair of heat rollers **28*a*, 28*b* for gripping the thermosensitive recording medium S therebetween, and a power supply 30 for supplying an electric current to the heat roller 28*a*. The post-recording heater 15 comprises a pair of heat rollers 34*a*, 34*b* for gripping the thermosensitive recording medium S therebetween, and a power supply 36 for supplying an electric current to the heat roller 34*a*. The power supplies 30, 36 and the driver 11 are controlled by a controller 38. As shown in FIG. 2, the thermosensitive recording medium S comprises a support layer 42 and a thermosensitive layer 46 disposed on the support layer 42, and has coloring characteristics as indicated by characteristic curves "a", "b" shown In FIG. 3**.

Operation of the thermal recording apparatus 10 will be described below.

Figure 3:
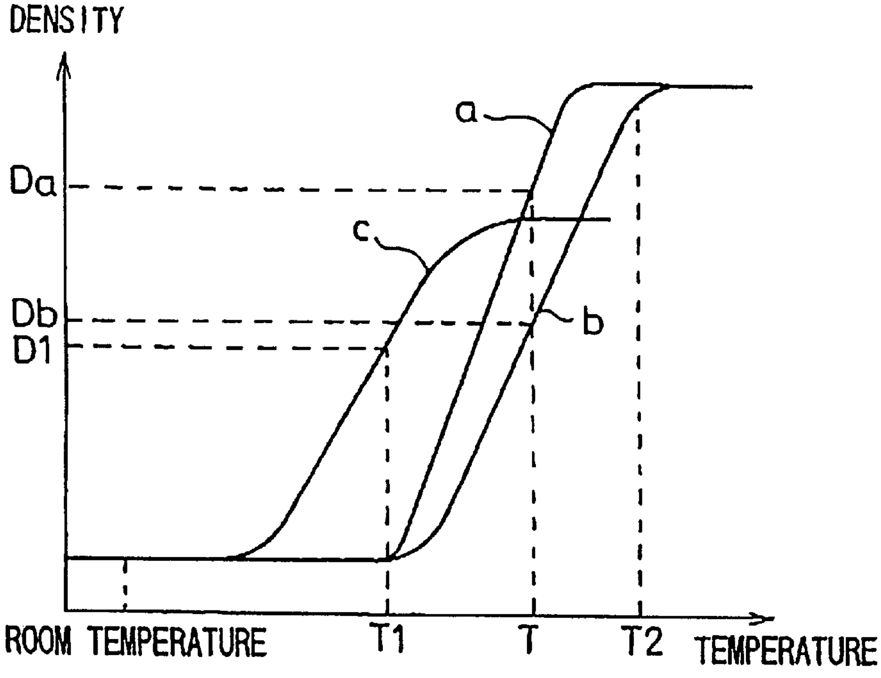
FIG. 3 is a diagram showing coloring characteristics of a thermosensitive recording medium.

The controller 38 controls the power supply 30 to energize the heat roller **28*a* to preheat the thermosensitive recording medium S while the thermosensitive recording medium S gripped between the heat rollers 28*a*, 28*b* is being fed in the direction B. The thermosensitive recording medium S is preheated by the heat roller 28*a* to a temperature beyond which the thermosensitive recording medium S produces color. FIG. 3 shows a characteristic curve "a" representing the relationship between the temperature of the thermosensitive recording medium S and the density of color produced thereby upon elapse of a sufficient period of time after the thermosensitive recording medium S has been heated to the temperature. The thermosensitive recording medium S is preheated to a temperature T1 by the heat roller 28*a***.

Then, the controller 38 controls the driver 11 to energize the thermal head 12. When energized, the resistive heating elements of the thermal head 12 are selectively heated depending on the gradation of an image to be recorded for thereby heating the thermosensitive recording medium S in the direction A while the thermosensitive recording medium S is being fed in the direction B. The thermal energy from the thermal head 12 is applied to the thermosensitive layer 46 of the thermosensitive recording medium S, recording the gradation image in the thermosensitive layer 46.

Since the thermosensitive recording medium S has been preheated to the temperature T1 shown in FIG. 3 by the thermal energy given by the heat roller 28*a*, it is not necessary to control the thermal head 12 in a wide temperature range from the room temperature in a location where the thermal recording apparatus 10 is installed to a temperature T2. Instead, the thermal head 12 is controlled in a temperature range from the temperature T1 to the temperature T2 to cause the thermosensitive recording medium S to produce color according to a characteristic curve "b" shown in FIG. 3 the instant the thermosensitive recording medium S is heated by the thermal head 12, thus forming a high-gradation image on the thermosensitive recording medium S. Because the thermal head 12 is not required to have a high output power range, the thermal recording apparatus 10 may be relatively simple in arrangement and may be manufactured relatively inexpensively.

Thereafter, the thermosensitive recording medium S with the gradation image recorded thereon is fed in the direction B by being gripped between the heat rollers 34*a*, 34*b*, and heated again by the heat roller 34*a*. Specifically, the controller 38 controls the power supply 36 to heat the heat roller 34*a* of the post-recording heater 15 for heating the thermosensitive recording medium S to the temperature T1. Inasmuch as the thermosensitive recording medium S has started producing color by being heated by the thermal head 12, the color producing reaction in the thermosensitive recording medium S is promoted by being reheated to the temperature T1 by the post-recording heater 15. The color density now increases to a density according to the characteristic curve "a".

More specifically, when thermal energy is applied to the thermosensitive recording medium S by the thermal head 12, the thermosensitive recording medium S produces color according to the characteristic curve "b" shown in FIG. 3. The color density then increases to a density according to the characteristic curve "a" when the thermosensitive recording medium S is heated again to the temperature T1 by the post-recording heater 15. In order to achieve a color density Da, the thermal head 12 may be controlled to heat the thermosensitive recording medium S to a temperature T. thus causing the thermosensitive recording medium S to obtain color density Db.

As described above, after the image has been recorded on the thermosensitive recording medium S, the thermosensitive recording medium S is heated again to the temperature beyond which the thermosensitive recording medium S produces color. By thus heating the thermosensitive recording medium S, it is possible to complete the color producing reaction on the thermosensitive recording medium S within a short period of time, and to record an image having a density which will remain stable for a long period of time without subsequent aging.

In the case where the thermosensitive recording medium S is of the type in which coloring agents are sealed in ultraviolet-curing microcapsules, an ultraviolet lamp 50 may be positioned downstream of the post-recording heater 15, as indicated by the dotted lines in FIGS. 1 and 2, for fixing a recorded image by way of ultraviolet radiation for stabler image density after the thermosensitive recording medium S has been heated by the post-recording heater 15. Specifically, after microcapsules have been decomposed to produce color by thermal energy from the thermal head 12, the thermosensitive recording medium S is heated by the post-recording heater 15, and then exposed to ultraviolet radiation from the ultraviolet lamp 50. Upon exposure to ultraviolet radiation, any remaining microcapsules which have not been decomposed are set against decomposition, so that the recorded image has a density which will be stable for a long period of time without aging.

In the above embodiment, since the thermosensitive recording medium S is fed by being gripped between the heat rollers 28*a*, 28*b* and 34*a*, 34*b*, the heated thermosensitive recording medium S is prevented from being deformed or can be corrected of deformations.

Figure 4A:
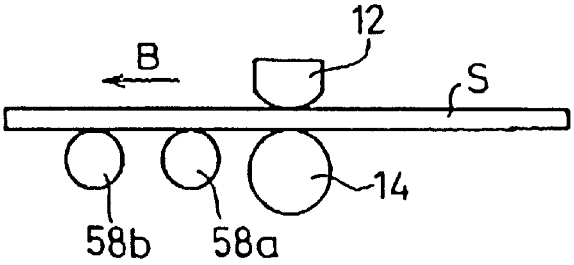
FIGS. 4A, 4B, and 4C are side elevational views of post-recording heaters according to other embodiments of the present invention.

As shown in FIG. 4A, a post-recording heater may comprise a plurality of heat rollers 58*a*, 58*b* arrayed In the direction B for heating the thermosensitive recording medium S at a stable and highly accurate temperature after an image has been recorded on the thermosensitive recording medium S. If the thermal capacity of the heat roller 34*a* shown in FIG. 2 is small, the applied heat may be absorbed by the thermosensitive recording medium S, which tends to suffer temperature irregularities. In FIG. 4A, after the thermosensitive recording medium S has been heated by the heat roller 58*a*, the thermosensitive recording medium S is heated to a predetermined temperature. In this manner, the thermosensitive recording medium S can be maintained accurately at a desired temperature.

Figure 4B:
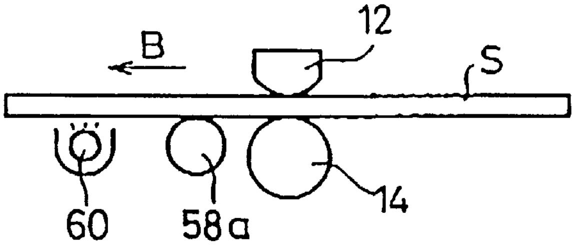

In still another embodiment shown in FIG. 4B, a post-recording heater comprises a heat roller 58*a* and a heating light source 60 disposed downstream of the heat roller 58*a*. After the thermosensitive recording medium S has been heated by the heat roller 58*a*, the thermosensitive recording medium S is further heated by radiant thermal energy from the heating light source 60.

Figure 4C:
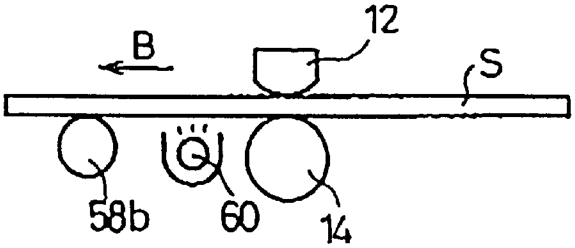

FIG. 4C shows another embodiment in which a post-recording heater comprises a heating light source 60 and heat roller 58*b* disposed downstream of the heating light source 60. In FIG. 4C, the thermosensitive recording medium S is first heated by radiant thermal energy from the heating light source 60, and then heated by the heat roller 58*b*. The heating light source 60 may be controlled to apply a substantial proportion of thermal energy required to heat the thermosensitive recording medium S after recording, so that any thermal energy output requirement of the heat roller 58*b* may be relatively small. Such an arrangement makes it possible to heat the thermosensitive recording medium S more accurately after recording.

The preheater may be arranged to incorporate any of the structures shown in FIGS. 4A through 4C.

Figure 5:
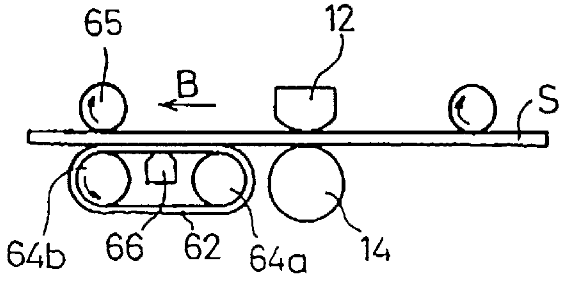
FIG. 5 is a side elevational view of a post-recording heater according to another embodiment of the present invention.

FIG. 5 shows a post-recording heater according to another embodiment of the present invention. The post-recording heater comprises a pair of nip rollers 64*a*, 64*b*, a thin belt 62 of low thermal conductivity trained around the rollers 64*a*, 64*b*, a roller 65 positioned above the belt 62, and a heater 66 disposed beneath the upper run of the belt 62 between the rollers 64*a*, 64*b*. The thermosensitive recording medium S is fed by being gripped between the belt 62 and the roller 65, and heated by the heater 66 through the belt 62 after an image has been recorded on the thermosensitive recording medium S. Since only a required area of the thermosensitive recording medium S is heated by the heater 66 through the belt 62 which is of low thermal conductivity, the temperature to which the thermosensitive recording medium S is heated after recording can be controlled easily and accurately. As the heater 66 is vertically surrounded by the belt 62, but opens laterally, convectional air heated by the heater 66 escapes laterally from the thermosensitive recording medium S. The thermosensitive recording medium S is prevented from being scratched by the heater 66 as the heater 66 is held out of contact with the thermosensitive recording medium S.

Figure 6:
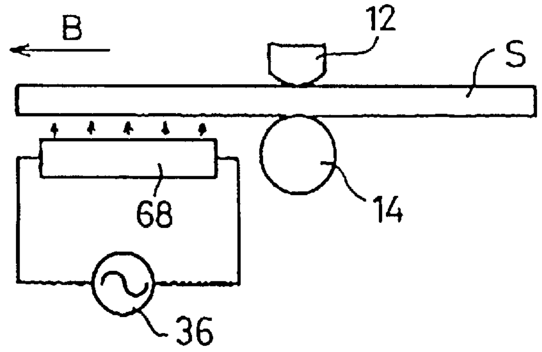
FIG. 6 is a side elevational view of a post-recording heater according to still another embodiment of the present invention.
Figure 7:
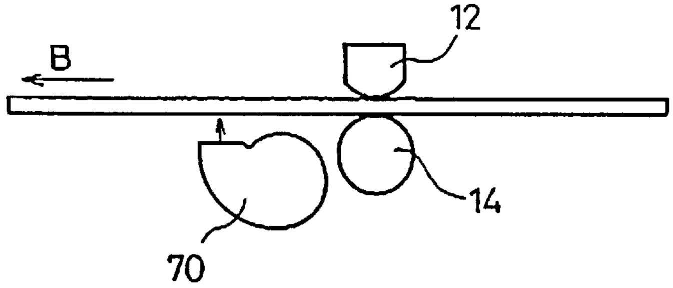
FIG. 7 is a side elevational view of a post-recording heater according to yet another embodiment of the present invention.

According to still another embodiment of the present invention shown in FIG. 6, a post-recording heater comprises an infrared heater 68 energizable by a power supply 36, the infrared heater 68 being disposed closely to, but held out of contact with, a surface of the thermosensitive recording medium S opposite to the surface thereof which is heated by the thermal head 12. Infrared radiation from the infrared heater 68 is applied to the thermosensitive recording medium S to heat the thermosensitive recording medium S after an image has been recorded thereon. As the infrared heater 68 does not contact the thermosensitive recording medium S, the thermosensitive recording medium S can be fed smoothly without physical interference with the infrared heater 68. Instead of the infrared heater 68, a hot-air heater 70 shown in FIG. 7 may be disposed below the thermosensitive recording medium S to apply hot air to the thermosensitive recording medium S to heat the same after an image has been recorded thereon. The thermosensitive recording medium S may be heated by hot-air heaters positioned one on each side thereof so that opposite surfaces of the thermosensitive recording medium S can be heated.

Figure 8A:
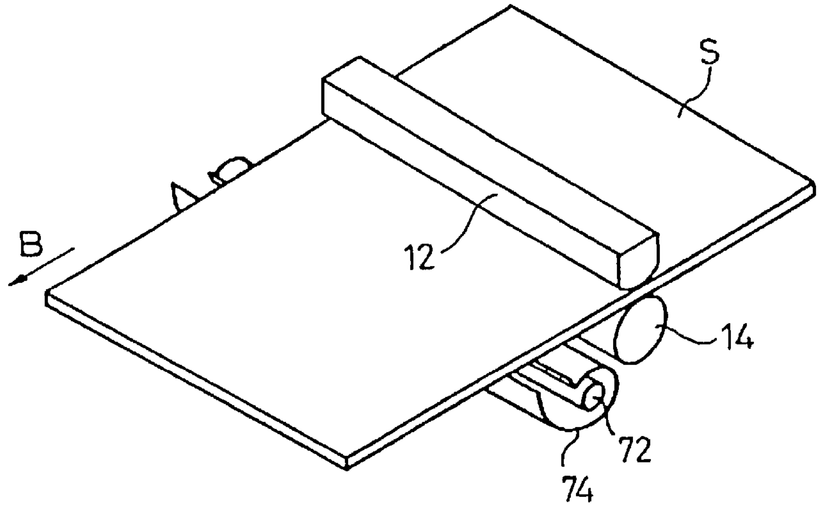
FIGS. 8A and 8B are perspective and side elevatlonal views, respectively, of a post-recording heater according to yet still another embodiment of the present invention.
Figure 8B:
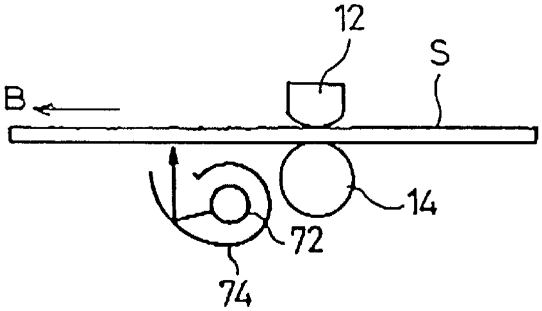

FIGS. 8A and 8B show a post-recording heater according to yet still another embodiment of the present invention. The post-recording heater shown in FIGS. 8A and 8B comprises an infrared heater 72 disposed below the thermosensitive recording medium S and surrounded by a reflector 74. The reflector 74 has a length greater than the width of the thermosensitive recording medium S across the direction B for allowing heated air to be discharged from the opposite ends of the reflector 74. Since heated air is discharged from the opposite ends of the reflector 74, undesired areas of the thermosensitive recording medium S will not be heated by convectional air, and the thermosensitive recording medium S does not suffer temperature irregularities due to convection. Consequently, the post-recording heater shown in FIGS. 8A and 8B can highly accurately control the heating of the thermosensitive recording medium S after recording.

Figure 9:
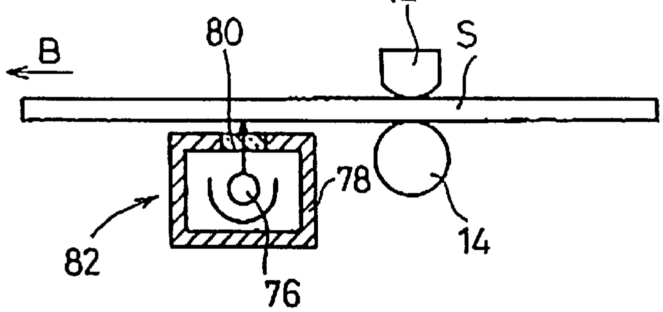
FIG. 9 is a side elevational view, partly in cross section, of a post-recording heater according to a further embodiment of the present invention.

According to a further embodiment of the present invention shown in FIG. 9, a post-recording heater comprises a heater assembly 82 for heating the thermosensitive recording medium S after an image has been recorded thereon. The heater assembly 82 is a fully closed structure comprising an infrared heater 76 disposed below the thermosensitive recording medium S, a heat-insulating casing 78 encasing the infrared heater 76, and a filter 80 mounted in an opening defined in the heat-insulating casing 78 in confronting relation to the thermosensitive recording medium S. Since only a required area of the thermosensitive recording medium S is heated by the infrared radiation applied through the filter 80, no excessive temperature rise is developed in the thermal recording apparatus. Inasmuch as the heater assembly 82 is of a fully closed structure, no convectional air is produced in the thermal recording apparatus by the heat of the infrared radiation, and it is possible to heat a local image-recorded area of the thermosensitive recording medium S highly accurately. The filter 80 may be dispensed with if the opening in the heat-insulating casing 78 is sufficiently small.

Figure 10:
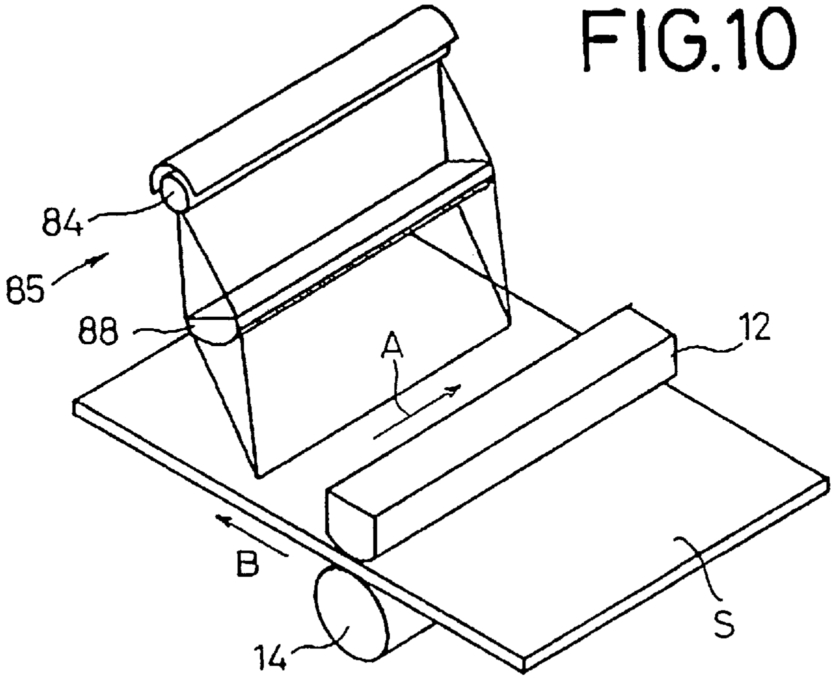
FIG. 10 is a perspective view of a post-recording heater according to a still further embodiment of the present invention.

FIG. 10 shows a post-recording heater 85 according to a still further embodiment of the present invention. The post-recording heater 85 employs a near-infrared lamp 84 for emitting near-infrared radiation, the near-infrared lamp 84 being elongate in the main scanning direction indicated by the arrow A across the thermosensitive recording medium S. The near-infrared lamp 84 is positioned downstream of the thermal head 12 with respect to the direction B. The post-recording heater 85 also has a cylindrical lens 88 positioned between the near-infrared lamp 84 and the thermosensitive recording medium S. If the support layer 42 or the thermosensitive layer 46 of the thermosensitive recording medium S contains a dye for absorbing the near-infrared radiation of a certain wavelength which has passed through the cylindrical lens 88, then the thermosensitive recording medium S can effectively be heated after recording. Specifically, since the near-infrared radiation can be converged onto the thermosensitive recording medium S by the cylindrical lens 88, the thermosensitive recording medium S can be heated efficiently in a short period of time. Use of the cylindrical lens 88, or selection of a wavelength that passes through the cylindrical lens 88 and the dye for absorbing the near-infrared radiation allows the thermosensitive recording medium S to be heated in a limited necessary area. Therefore, the thermosensitive recording medium S can be heated highly accurately. In the embodiment shown in FIG. 10, the thermosensitive recording medium S is heated by the post-recording heater 85 in the same direction as it is by the thermal head 12. However, the thermosensitive recording medium S may heated in any desired direction.

Figure 11:
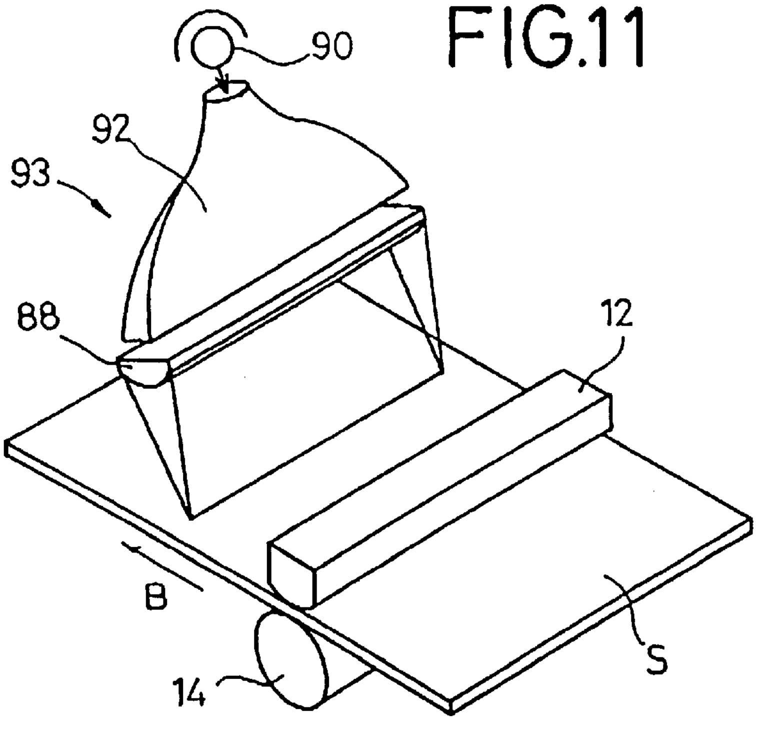
FIG. 11 is a perspective view of a post-recording heater according to a yet further embodiment of the present invention.

According to a yet further embodiment of the present invention shown in FIG. 11, a post-recording heater 93 comprises a near-infrared spot lamp 90, a cylindrical lens 88, and a light guide 92 disposed between the near-infrared spot lamp 90 and the cylindrical lens 88. The light guide 92 has an upper constricted end positioned closely to the near-infrared spot lamp 90 and a lower elongate end positioned closely to and extending along the cylindrical lens 88. The light guide 92 guides near-infrared radiation from the near-infrared spot lamp 90 through the cylindrical lens 88 to the thermosensitive recording medium S. The post-recording heater 93 is free from heating irregularities which would otherwise result from emission irregularities of a certain radiation source such as a linear radiation source.

Figure 12:
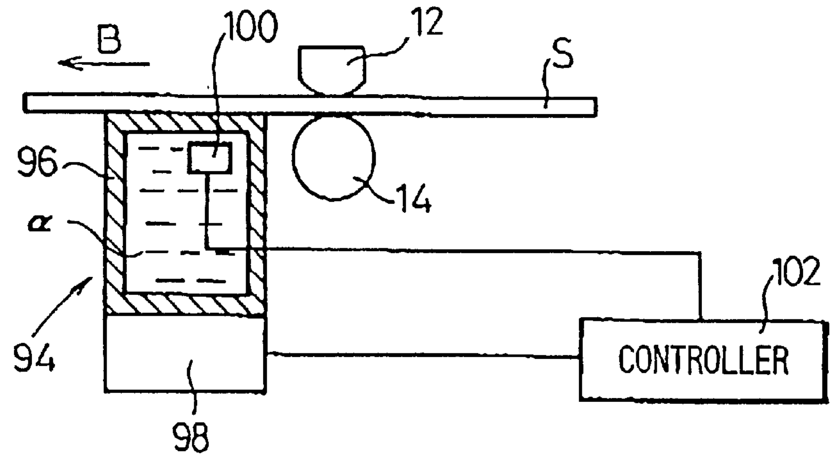
FIG. 12 is a perspective view of a post-recording heater according to a yet still further embodiment of the present invention.

FIG. 12 shows a post-recording heater 94 which utilizes the melting point of a material α according to a yet still further embodiment of the present invention. The post-recording heater 94 comprises a casing 96 held in contact with the thermosensitive recording medium S after an image has been recorded on the thermosensitive recording medium S. The casing 96 accommodates a material α which is melted from a solid phase into a liquid phase at a certain temperature. The material α is melted by a heater 98 connected to the casing 96. The temperature of the material α is detected by a temperature sensor 100 in the casing 96, and supplied to a controller 102 which controls the heater 98 to keep the material α at a constant temperature. Since the melting point of the material α, at which the material α changes from a solid phase into a liquid phase, is stable with respect to energy applied from the external environment, the temperature of the material α can be controlled highly accurately. The material α may be $2N_2H_4.H_2SO_4$ having a melting point of about 85° C., solder having a low melting point of about 100° C., thio-acetamide having a melting point of about 115° C., tri-bromo acetic acid having a melting point of about 135° C., or In having a melting point of about 155° C.

Figure 13:
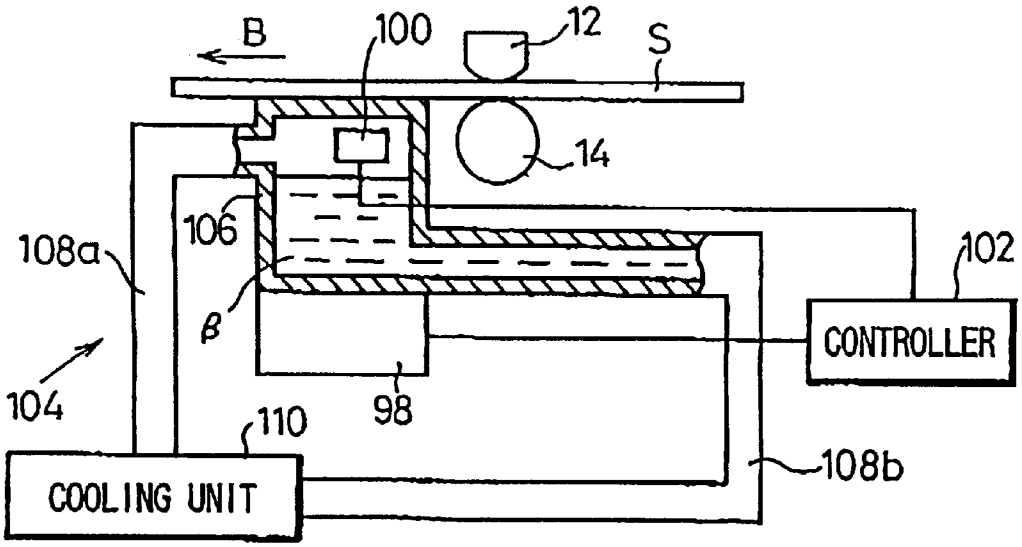
FIG. 13 is a side elevational view, partly in cross section, of a post-recording heater according to another embodiment of the present invention.

FIG. 13 shows a post-recording heater 104 which utilizes the boiling point of a material β according to another embodiment of the present invention. The post-recording heater 104 comprises a casing 106 held in contact with the thermosensitive recording medium S after an image has been recorded on the thermosensitive recording medium S. The casing 106 accommodates a material β which is boiled from a liquid phase into a vapor phase at a certain temperature. The material β is boiled by a heater 98 connected to the casing 106. The temperature of the material β is detected by a temperature sensor 100 in the casing 106, and supplied to a controller 102 which controls the heater 98 to keep the material β at a constant temperature. The material β is supplied through a pipe 108*a* to a cooling unit 110 and cooled by the cooling unit 110. The cooled material β is returned through a pipe 108*b* back to the casing 106. Since the boiling point of the material β, at which the material β changes from a liquid phase into a vapor phase, is stable with respect to energy applied from the external environment, the temperature of the material β can be controlled highly accurately. The material β may be ethyl alcohol having a boiling point of about 78.5° C., water having a boiling point of about 100° C., acetic acid having a boiling point of about 118.1° C., or acetic anhydride having a boiling point of about 140° C.

Figure 14:
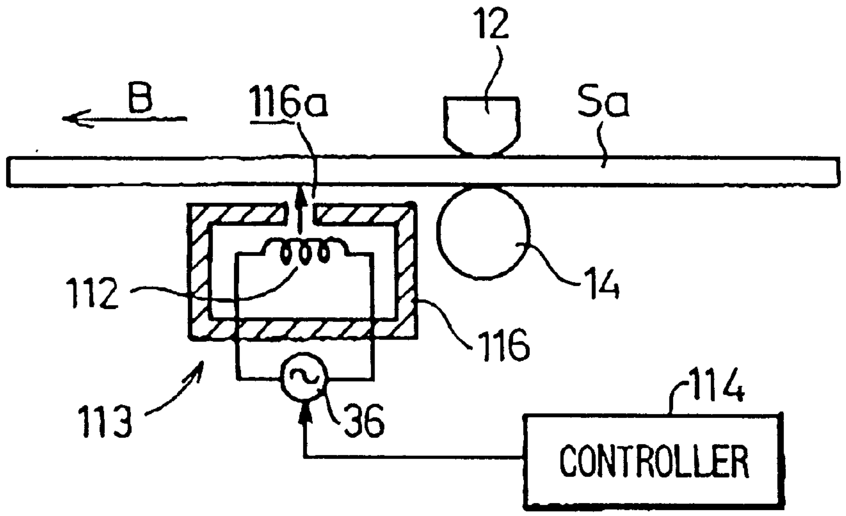
FIG. 14 is a side elevational view, partly in cross section, of a post-recording heater according to still another embodiment of the present invention.

FIG. 14 shows a post-recording heater 113 according to still another embodiment of the present invention. The post-recording heater 113 comprises a high-frequency induction coil 112 for heating a thermosensitive recording medium out of contact therewith. Specifically, the high-frequency induction coil 112 is positioned closely to and out of contact with a thermosensitive recording medium Sa which has a support layer of metal. The high-frequency induction coil 112 is energized by a controller 114 to heat the thermosensitive recording medium Sa after an image has been recorded thereon. The high-frequency induction coil 112 is disposed in and shielded by a casing 116 which has a slit 116*a* opening toward the thermosensitive recording medium Sa along an area to be heated of the thermosensitive recording medium Sa. Because only an area of the thermosensitive recording medium Sa where an image has been recorded is heated by the high-frequency induction coil 112 through the slit 116*a*, an image free of blurs is formed highly accurately on the thermosensitive recording medium Sa.

The preheater may be arranged to incorporate any of the structures shown in FIGS. 5 through 14.

Figure 15:
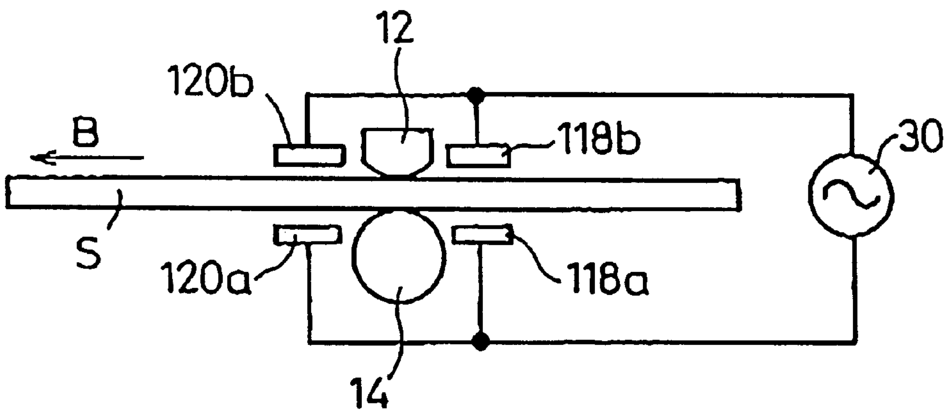
FIG. 15 is a side elevational view of a preheater and a post-recording heater according to yet another embodiment of the present invention.

FIG. 15 shows a preheater and a post-recording heater according to yet another embodiment of the present invention, each of the preheater and the post-recording heater comprising an induction heater. As shown in FIG. 15, two electrodes 118*a*, 120*a* are disposed on one side, where the platen roller 14 is located, of a thermosensitive recording medium S free of any metal layers in the vicinity of an area of the thermosensitive recording medium S in which an image is recorded, and two electrodes 118*b*, 120*b* are disposed on the other side of the thermosensitive recording medium S in confronting relation to the electrodes 118*a*, 120*a*, respectively. The thermosensitive recording medium S is preheated and heated after recording when a high-frequency electric field is applied between the electrodes 118*a*, 118*b* and also between the electrodes 120*a*, 120*b* by the power supply 30. Specifically, the thermosensitive recording medium S is preheated to a desired temperature by dielectric energy produced between the electrodes 118*a*, 118*b* disposed upstream of the thermal head 12 and the platen roller 14, and then an image is recorded on the preheated thermosensitive recording medium S by the thermal head 12. Thereafter, the thermosensitive recording medium S is heated by dielectric energy produced between the electrodes 120*a*, 120*b* disposed downstream of the thermal head 12 and the platen roller 14, thereby stabilizing color produced on the thermosensitive recording medium S, i.e., the image recorded on the thermosensitive recording medium S. The power supply 30 may be controlled to apply high-frequency electric field pulses between the electrodes 118*a*, 118*b* and also between the electrodes 120*a*, 120*b* to heat the thermosensitive recording medium S in a pulsed manner. It is known that the thermosensitive layer 46 of the thermosensitive recording medium S has its sensitivity increased upon pulsed heating. In dielectric heating, the thermosensitive recording medium S is not required to include a metal layer having a large thermal conductivity. Therefore, the local temperature of the thermosensitive recording medium S can be controlled accurately in a short period of time, so that an image can be recorded highly accurately on the thermosensitive recording medium S at a high speed.

Figure 16:
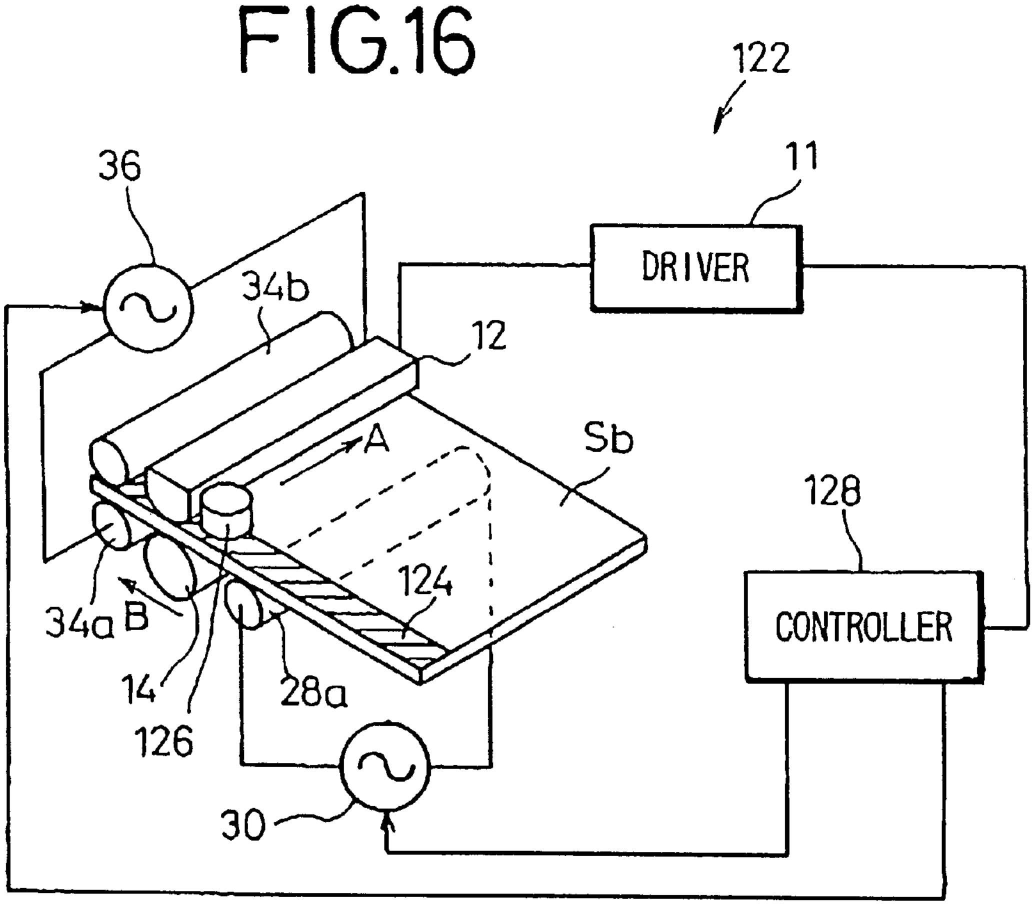
FIG. 16 is a schematic perspective view, partly in block form, of a thermal recording apparatus according to another embodiment of the present invention.
Figure 17:
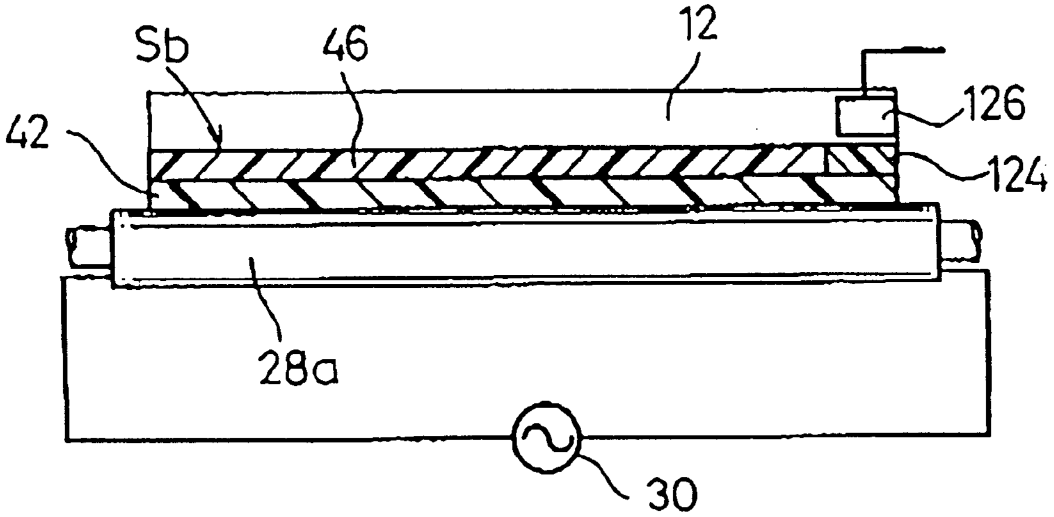
FIG. 17 is an elevational view, partly in cross section, of the thermal recording apparatus shown in FIG. 16.

FIGS. 16 and 17 show a thermal recording apparatus 122 according to another embodiment of the present invention. Those parts of the thermal recording apparatus 122 which are identical to those of the thermal recording apparatus 10 shown in FIG. 1 are denoted by identical reference numerals, and will not be described in detail below. As shown in FIG. 17, the thermal recording apparatus 122 employs a thermosensitive recording medium Sb comprising a support layer 42 and a thermosensitive layer 46 disposed on the support layer 42. The thermosensitive recording medium Sb also has a thermosensitive coloring side strip 124 which produces color at a temperature lower than the thermosensitive layer 46 (which has the coloring characteristics indicated by the curves "a", "b" in FIG. 3) as indicated by a characteristic curve "c" in FIG. 3. As shown in FIG. 16, the thermal recording apparatus 122 includes a heat roller 28*a* held as a preheater against the thermosensitive recording medium Sb upstream of the thermal head 12 and the platen roller 14, a densitometer 126 disposed closely to the thermosensitive coloring side strip 124 of the thermosensitive recording medium Sb, and a controller 128 for controlling the driver 11 and also controlling the power supply 30 based on the color density of the thermosensitive coloring side strip 124 detected by the densitometer 126. The thermosensitive recording medium Sb is gripped between heat rollers 34*a*, 34*b* as a post-recording heater downstream of the thermal head 12 and the platen roller 14. The temperature of the heat rollers 34*a*, 34*b* is adjusted by the power supply 36 which is controlled by the controller 128.

The thermal recording apparatus 122 operates as follows: The power supply 30 is controlled by the controller 128 to supply a current to the heat roller 28*a* for thereby heating the heat roller 28*a*. When heated, the heat roller 28*a* preheats the thermosensitive recording medium Sb. At this time, the color density of the thermosensitive layer 46 of the thermosensitive recording medium Sb does not vary, but the color density of the thermosensitive coloring side strip 124 thereof varies. The densitometer 126 detects the color density of the thermosensitive coloring side strip 124, and supplies detected density data to the controller 128. The controller 128 then controls the power supply 30 to preheat the thermosensitive recording medium Sb to a temperature T1 such that the density data will indicate a color density D1 at the temperature T1. The temperature of the preheated thermosensitive recording medium Sb can be adjusted highly accurately because the temperature thereof is detected directly by the densitometer 126. Then, the thermosensitive recording medium Sb is heated by the thermal head 12 to produce color according to the characteristic curve "b" shown in FIG. 3, thereby recording an image thereon. After the image has been recorded on the thermosensitive recording medium Sb, the controller 128 controls the power supply 36 to energize the heat roller 34*a* to heat the thermosensitive recording medium Sb. The heated thermosensitive recording medium Sb now produces color to a density represented by the characteristic curve "a" shown in FIG. 3, whereupon the color density thereof is stabilized. By adjusting the preheating temperature and also the output of the thermal head 12 based on the preheating temperature, it is possible to record an image of higher quality.

Figure 18:
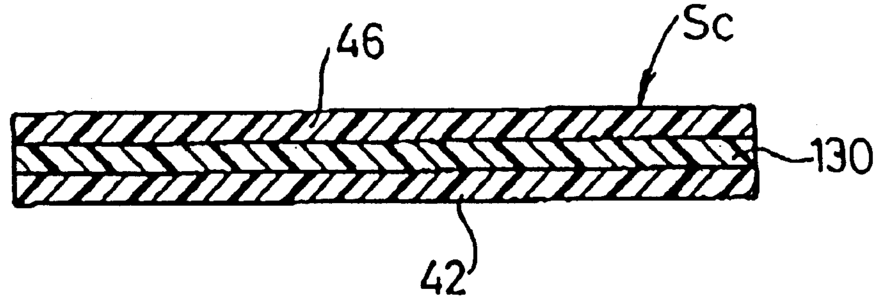
FIG. 18 is a cross-sectional view of a thermosensitive recording medium.

A thermosensitive recording medium Sc shown in FIG. 18 may be employed instead of the thermosensitive recording medium Sb. The thermosensitive recording medium Sc comprises a support layer 42, a preheat coloring layer 130 disposed on the support layer 42, and a thermosensitive layer 46 disposed on the preheat coloring layer 130. The preheat coloring layer 130 is made of a thermochromic material or the like which produces color up to a density depending on the temperature, and returns to its original density when the temperature decreases. The thermosensitive layer 46 transmits light therethrough when not heated to produce color. The preheating temperature can be adjusted by measuring the color density of the preheat coloring layer 130 with the densitometer 126. Since the color density of the preheat coloring layer 130 returns to the original density upon a temperature reduction after an image has been recorded, the color density of the preheat coloring layer 130 does not affect the image density of the thermosensitive layer 46. With the thermosensitive recording medium Sc, an area of the thermosensitive recording medium Sc where an image is recorded is not limited by the preheat coloring layer 130, and the densitometer 126 can be positioned with greater freedom relative to the thermosensitive recording medium Sc. If the support layer 42 is made of a light-transmissive material, then the densitometer 126 may be located on the support layer side of the thermosensitive recording medium Sc.

Figure 19:
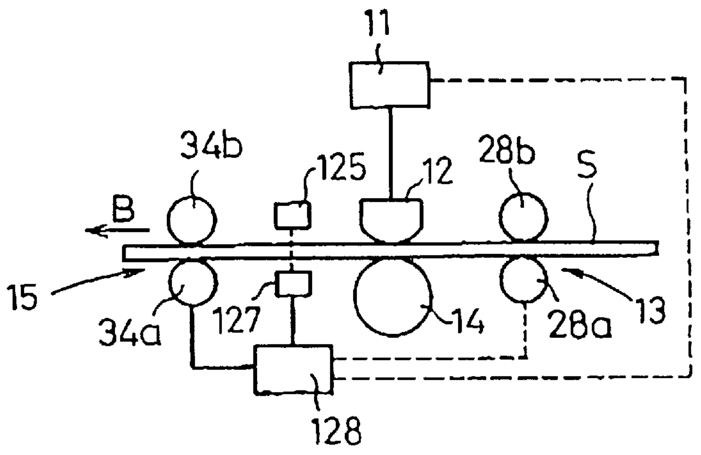
FIG. 19 is a side elevational view of a thermal recording apparatus according to a further embodiment of the present invention.

FIG. 19 illustrates a thermal recording apparatus according to a further embodiment of the present invention. As shown in FIG. 19, the thermal recording apparatus Includes a light-emitting diode (LED) 125 for emitting light and a light detector 127 for detecting the intensity of light emitted from the LED 125 and having passed through the thermosensitive recording medium S. The LED 125 and the light detector 127 are positioned between the thermal head 12 and the post-recording heater 15 composed of the heat rollers 34*a*, 34*b*. The temperature of the post-recording heater 15 is controlled based on a detected signal from the light detector 127. More specifically, the thermal head 12 applies a certain level of thermal energy to an area of the thermosensitive recording medium S outside of an image recording area thereof, and the color density of that area of the thermosensitive recording medium S is detected as the intensity of light emitted from the LED 125 and having passed through the thermosensitive recording medium S, by the light detector 127. The controller 128 then controls the temperature of the post-recording heater 15 so that the color density of the thermosensitive recording medium S which corresponds to the detected signal from the light detector 127 becomes a predetermined density.

Figure 20:
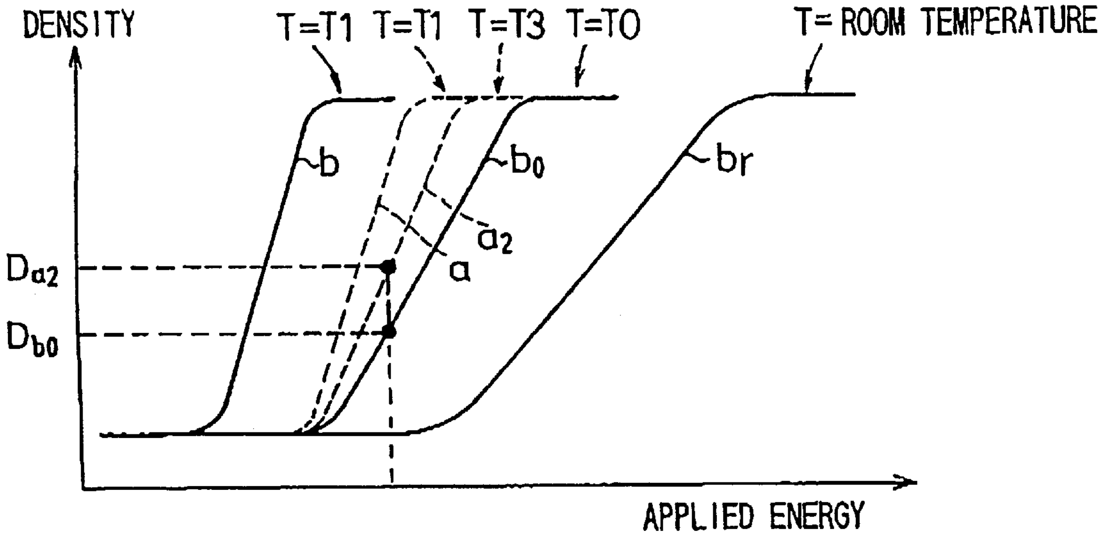
FIG. 20 is a diagram showing coloring characteristics of a thermosensitive recording medium.

The thermosensitive recording medium S has coloring characteristics such that the color density increases as the preheating temperature or the heating temperature after recording increases, as shown in FIG. 20. If the thermosensitive recording medium S which has not been preheated by the preheater 13 but has been kept at room temperature is heated by the thermal head 12 to record an image thereon, then the thermosensitive recording medium S produces color according to a characteristic curve "br" shown in FIG. 20. If the thermosensitive recording medium S is preheated to a preheating temperature T0 (T0>room temperature) by the preheater 13 and thereafter heated by the thermal head 12, then the thermosensitive recording medium S produces color according to a characteristic curve "bo" shown in FIG. 20. If the thermosensitive recording medium S is preheated to a preheating temperature T1 (T1>T0), beyond which the thermosensitive recording medium S produces color, by the preheater 13 and thereafter heated by the thermal head 12, then the thermosensitive recording medium S produces color according to a characteristic curve "b" shown in FIG 20. If the thermosensitive recording medium S which has produced color according to the characteristic curve "bo" is heated to a temperature T3 (T3>T0) by the post-recording heater 15, the color density increases according to a characteristic curve "a2". If the thermosensitive recording medium S which has produced color according to the characteristic curve "bo" is heated to the temperature T1 (T1>T3) by the post-recording heater 15, the color density increases according to a characteristic curve "a".

It is assumed in the embodiment shown in FIG. 19 that the color density of an area of the thermosensitive recording medium S outside of an image recording area thereof after an image has been recorded by the thermal head 12 is Db0, and a desired color density is Da2. The controller 128 controls the post-recording heater 15 to be heated to the temperature T3 to achieve the characteristic curve "a2". As a result, an image of the desired color density can be produced on the thermosensitive recording medium S. The preheating temperature or the output of the thermal head 12 may be controlled while at the same time the post-recording heating temperature is controlled.

Figure 21:
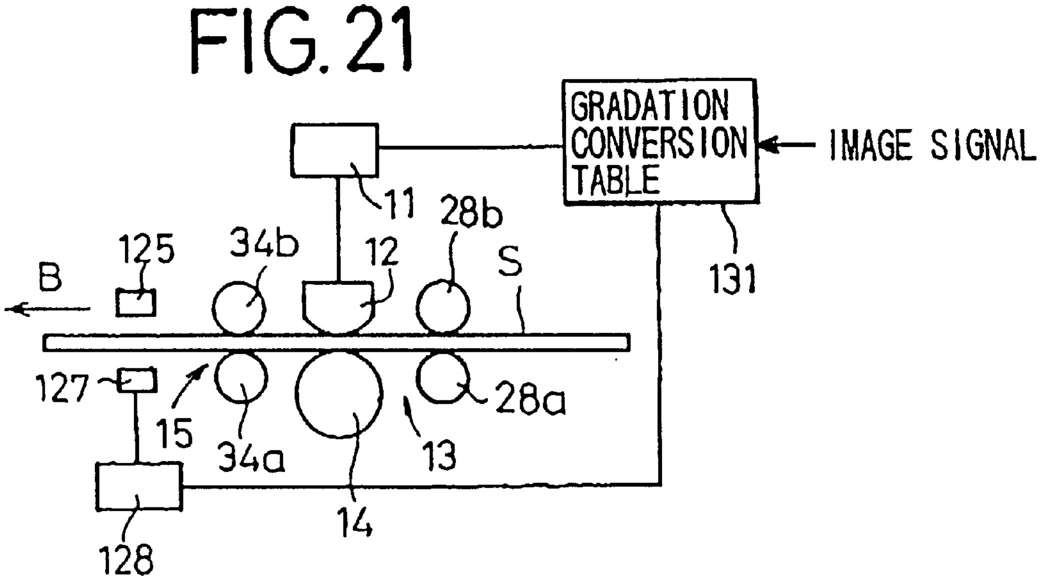
FIG. 21 is a side elevational view, partly in block form, of a thermal recording apparatus according to a still further embodiment of the present invention.

FIG. 21 shows a thermal recording apparatus according to a still further embodiment of the present invention. The thermal recording apparatus shown in FIG. 21 includes an LED 125 and a light detector 127, identical to those shown in FIG. 19, disposed downstream of the post-recording heater 15, and a gradation conversion table 131 which is corrected based on a measured color density of a step edge which is formed on the thermosensitive recording medium S by the thermal head 12. The preheater 13 and the post-recording heater 15 are adjusted to a predetermined preheating temperature and a predetermined post-recording heating temperature, e.g., the temperature T1 beyond which the thermosensitive recording medium S produces color. Under this condition, a step edge whose color density varies stepwise is formed on a test thermosensitive recording medium S by the thermal head 12 based on test data. The thermosensitive recording medium S with the recorded step edge is then heated by the post-recording heater 15, and the color density thereof is detected by the light detector 127. The controller 128 then corrects the gradation conversion table 131 so that the detected color density data become desired color density data based on the test data. When an image signal is subsequently supplied to the gradation conversion table 131, the gradation conversion table 131 converts the gradation of the supplied image signal, and outputs the gradation-converted image signal as a drive signal to the driver 11. Based on the drive signal, the driver 11 controls the thermal head 12 to record a desired image on the thermosensitive recording medium S. In this manner, an image of a desired color density is recorded on the thermosensitive recording medium S. Alternatively, a test thermosensitive recording medium S may not be employed, but a step edge may be formed on the thermosensitive recording medium S, and then a desired image may be recorded on the thermosensitive recording medium S using the gradation conversion table 131 corrected with the step edge.

Figure 22:
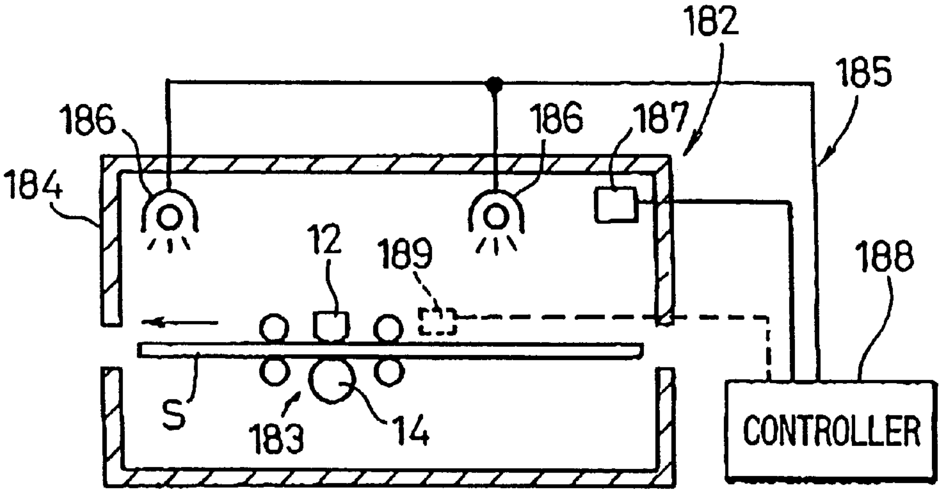
FIG. 22 is a side elevational view, partly in cross section, of a thermal recording apparatus according to another embodiment of the present invention.

FIG. 22 shows a thermal recording apparatus 182 according to another embodiment of the present invention. As shown in FIG. 22, the thermal recording apparatus 182 has a recording assembly 183 including the thermal head 12. The recording assembly 183 is disposed in and isolated by a heat-insulating casing 184. The thermal recording apparatus 182 also has a temperature adjuster 185 for adjusting the temperature in the heat-insulating casing 184 so that the thermosensitive recording medium S will be heated to a preheating temperature and a heating temperature after recording. The temperature adjuster 185 comprises heaters 186 such as lamps, a temperature detector 187, and a controller 188. The temperature in the heat-insulating casing 184 is detected by the temperature detector 187. Based on the detected temperature, the controller 188 controls the heater 186 to heat the thermosensitive recording medium S a preheating temperature and a heating temperature after recording. The heater 186 can maintain the thermosensitive recording medium S at a stable preheating temperature, and also heat the thermosensitive recording medium S to a stable heating temperature after an image has been recorded thereon. Accordingly the thermal recording apparatus 182 can record a highly accurate image on the thermosensitive recording medium S. If the controller 188 controls the thermal head 123 not to record any image when the temperature detected by the temperature detector 187 exceeds a predetermined preheating temperature or a predetermined heating temperature after recording, then undesirable images are prevented from being recorded on thermosensitive recording medium S.

A medium temperature detector 189 may be disposed closely to and upstream of the recording assembly 183 for directly detecting the temperature of the thermosensitive recording medium S. With such a modification, the preheating temperature and the heating temperature after recording, which have been reached by the heaters 186 controlled based on the temperature in the heat-insulating casing 184 as detected by the temperature detector 187, can be adjusted more accurately according the temperature of the thermosensitive recording medium S which is detected by the medium temperature detector 189. The history of medium temperatures of the thermosensitive recording medium S which is detected by the medium temperature detector 189 may be recorded, and the temperature of the thermosensitive recording medium S may be predicted from the temperature in the heat-insulating casing 184 with increased accuracy. As a consequence, the accuracy of recorded images may be increased. The temperature detector 187 may be dispensed with, and the temperature in the heat-insulating casing 184 may be adjusted based on the detected signal from the medium temperature detector 189 only.

Figure 23:
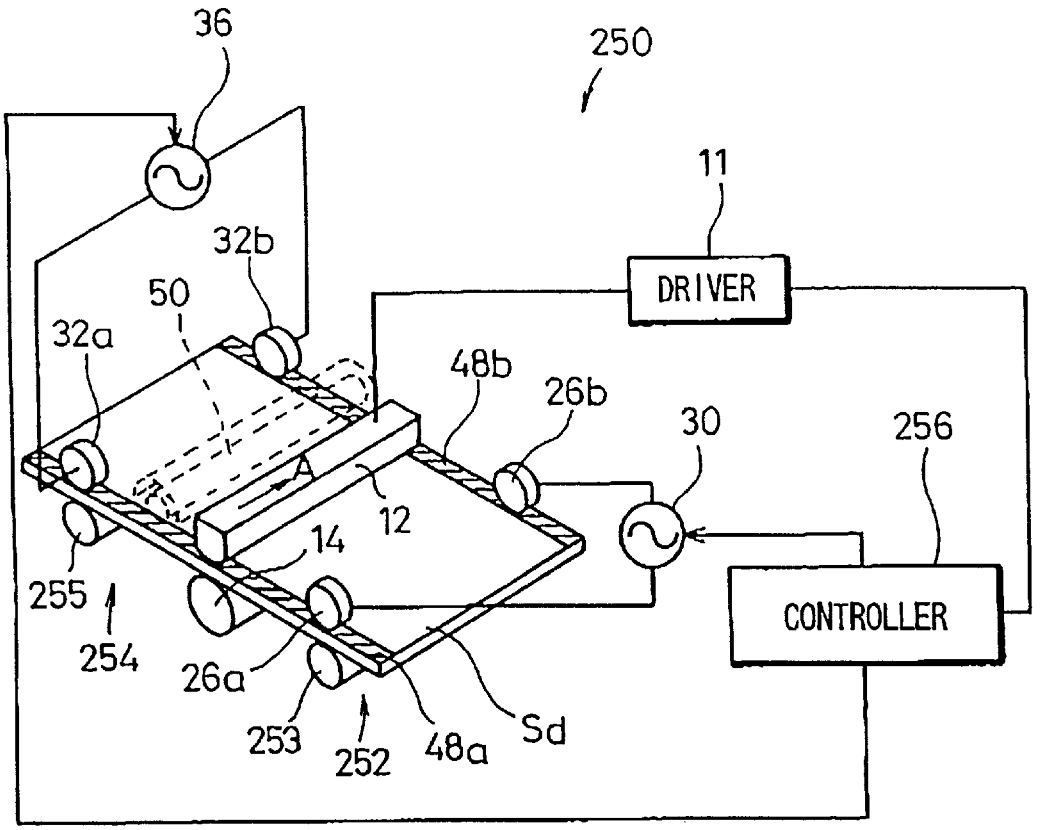
FIG. 23 is a perspective view, partly in block form, of a thermal recording apparatus according to still another embodiment of the present invention.
Figure 24:
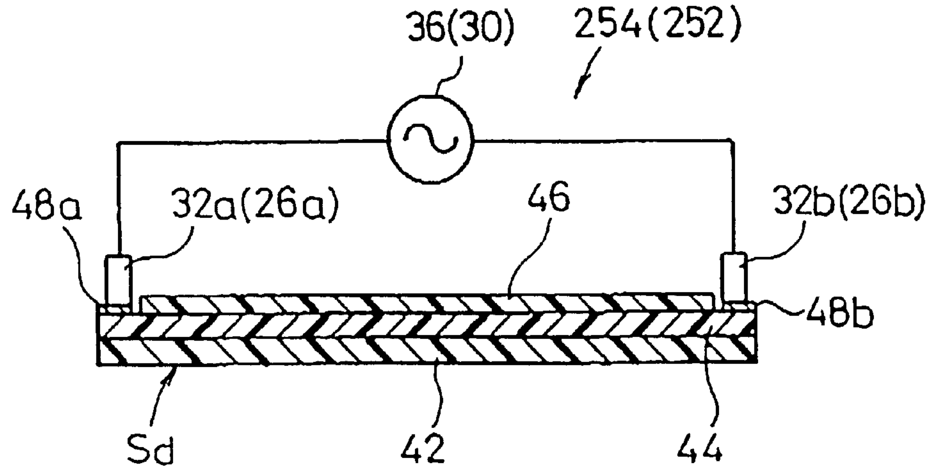
FIG. 24 is a cross-sectional view of a thermosensitive recording medium in the thermal recording apparatus shown in FIG. 23.

FIG. 23 shows a thermal recording apparatus 250 according to still another embodiment of the present invention. The thermal recording apparatus 250 employs a thermosensitive recording medium Sd having a resistive heating layer. More specifically, as shown in FIG. 24, the thermosensitive recording medium Sd comprises a support layer 42, an electrically conductive resistive heating layer 44 disposed on the support layer 42, a thermosensitive layer 46 disposed on the resistive heating layer 44, and a pair of laterally spaced electrode layers 48*a*, 48*b* disposed on the resistive heating layer 44 one on each side of the thermosensitive layer 46. The resistive heating layer 44 may comprise a flexible resistive heating panel such as an In-Sn oxide layer, a rubber heater, or the like.

The thermal recording apparatus 250 includes a preheater 252 comprising a pair of electrode rollers 26*a*, 26*b* for contacting the electrode layers 48*a*, 48*b* of the thermosensitive recording medium Sd, a support roller 253 disposed in confronting relation to the electrode rollers 26*a*, 26*b*, and a power supply 30 for supplying an electric current to the electrode rollers 26*a*, 26*b*. The thermal recording apparatus 250 also includes a post-recording heater 254 comprising a pair of electrode rollers 32*a*, 32*b* for contacting the electrode layers 48*a*, 48*b* of the thermosensitive recording medium Sd, a support roller 255 disposed in confronting relation to the electrode rollers 32*a*, 32*b*, and a power supply 30 for supplying an electric current to the electrode rollers 32*a*, 32*b*. The power supplies 30, 36 are controlled by a controller 256.

When the electrode rollers 26*a*, 26*b* of the preheater 252 contact the electrode layers 48*a*, 48*b* of the thermosensitive recording medium Sd, the resistive heating layer 44 is supplied with an electric current from the power supply 30 to preheat the thermosensitive recording medium Sd to a temperature beyond which the thermosensitive recording medium Sd produces color. After a gradation image has been recorded on the thermosensitive recording medium Sd by the thermal head 12, an electric current is supplied from the electrode rollers 32*a*, 32*b* of the post-recording heater 254 through the electrode layers 48*a*, 48*b* to the resistive heating layer 44 for thereby heating thermosensitive recording medium Sd. As a result, an image having stable color density is recorded on the thermosensitive recording medium Sd.

Figure 25:
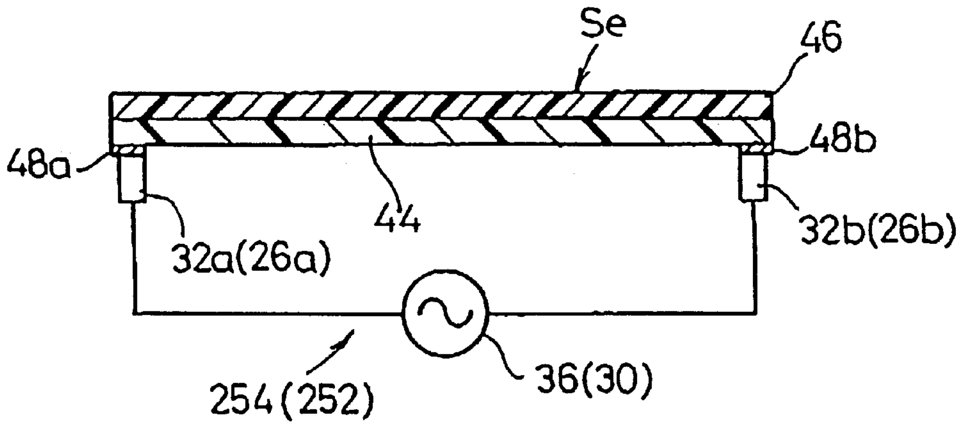
FIG. 25 is a cross-sectional view of a thermosensitive recording medium according to yet another embodiment of the present invention.

FIG. 25 shows a thermosensitive recording medium Se according to yet another embodiment of the present invention. In the thermosensitive recording medium Se, the support layer 42 shown in FIG. 24 is dispensed with so that the resistive heating layer 44 doubles as the support layer 42, and the electrode rollers 26*a*, 26*b*, 32*a*, 32*b* are held in contact with the opposite side of the thermosensitive recording medium Se to the side of thermosensitive recording medium Sd shown in FIG. 24 which is contacted by the electrode rollers 26*a*, 26*b*, 32*a*, 32*b*. Alternatively, the electrode layers 48*a*, 48*b* may be disposed on the side of the thermosensitive layer 46 to supply an electric current to the side of the thermosensitive recording medium Se which is contacted by the thermal head 12. Further alternatively, the thermosensitive recording medium Se may be supplied with an electric current from both sides thereof.

Figure 26:
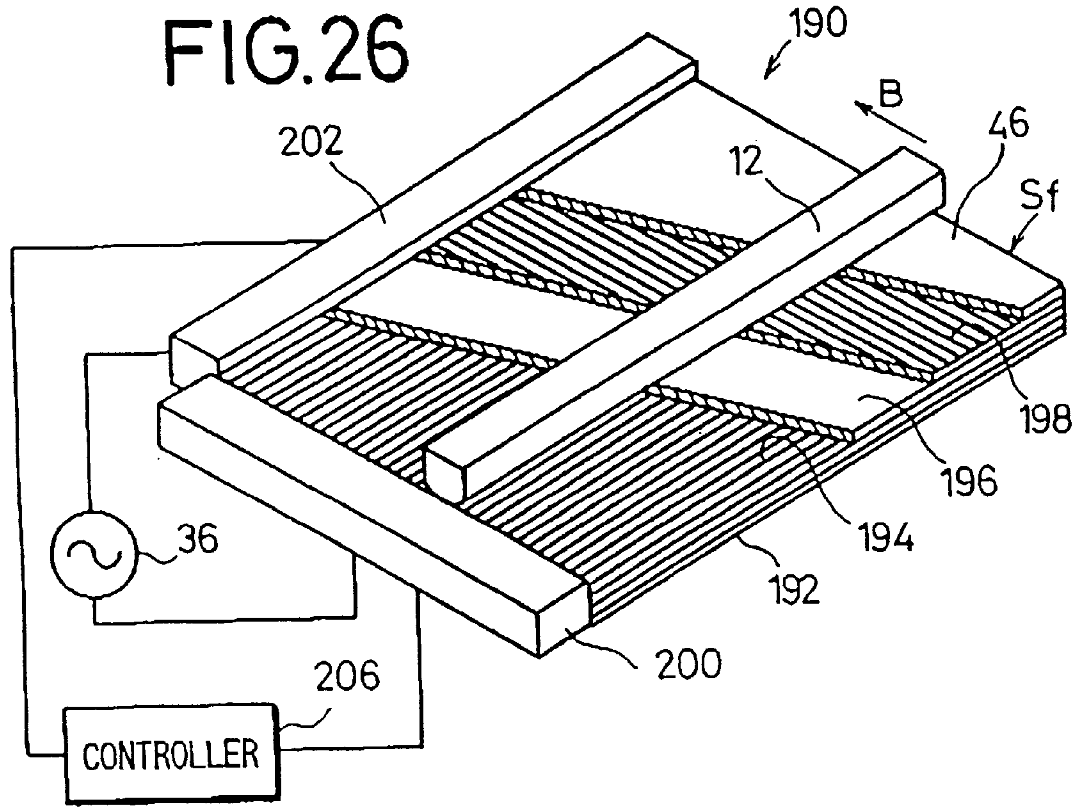
FIG. 26 is a perspective view, partly in block form, of a thermal recording apparatus according to yet still another embodiment of the present invention.
Figure 27:
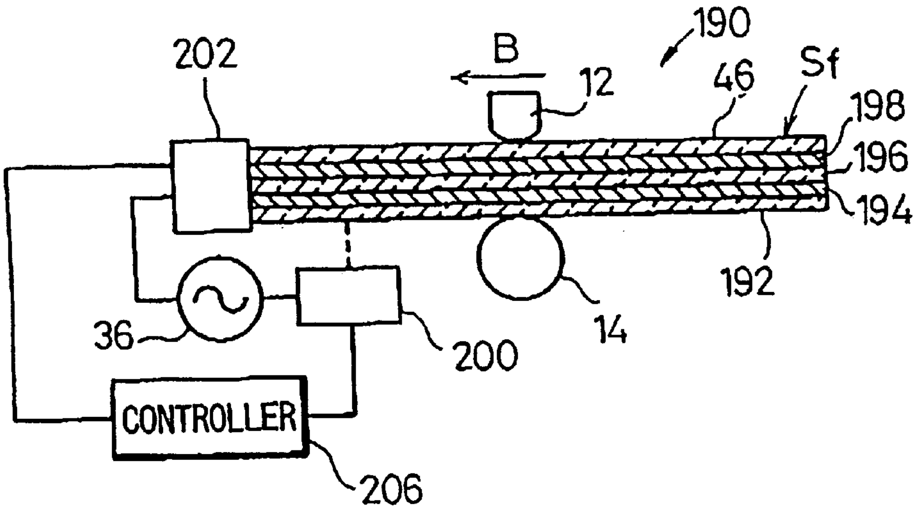
FIG. 27 is a side elevational view, partly in cross section, of the thermal recording apparatus shown in FIG. 26.

FIGS. 26 and 27 show a thermal recording apparatus 190 according to yet still another embodiment of the present invention. The thermal recording apparatus 190 employs a thermosensitive recording medium Sf having a matrix of electrodes. Specifically, the thermosensitive recording medium Sf comprises a support layer 192, a first electrode layer 194 disposed on the support layer 192 and having a plurality of parallel electrodes extending in the main scanning direction, an electrically conductive resistive heating layer 196 disposed on the first electrode layer 194, a second electrode layer 198 disposed on the resistive heating layer 196 and having a plurality of parallel electrodes extending in the auxiliary scanning direction, and a thermosensitive layer 46 disposed on the second electrode layer 198.

The thermal recording apparatus 190 includes a first electrode scanning unit 200 connected to the first electrode layer 194 of the thermosensitive recording medium Sf, a second electrode scanning unit 202 connected to the second electrode layer 198, and a power supply 36 connected between the first and second electrode scanning units 200, 202 for energizing them. The first and second electrode scanning units 200 are controlled by a controller 206. In operation, when the thermal head 12 is moved in the direction B with respect to the thermosensitive recording medium Sf, a desired image is recorded on the thermosensitive recording medium Sf by the thermal head 12. Then, the controller 206 controls the first and second electrode scanning units 200, 202 to select electrodes which are to be energized. The resistive heating layer 196 lying between the selected electrodes is heated to heat a desired area of the thermosensitive recording medium Sf after the image has been recorded thereon.

In this embodiment, only a desired area of the thermosensitive recording medium Sf can be heated by selected electrodes of the electrode matrix. The first and second electrode scanning units 200, 202 are controlled by the controller 206 to move a heated area in the direction B as the thermal head 12 moves, for thereby heating only a desired area of the recorded image to a constant temperature. The thermal recording apparatus 190 is therefore economical and capable of controlling the temperature highly accurately for recording accurate images on the thermosensitive recording medium Sf.

Figure 28:
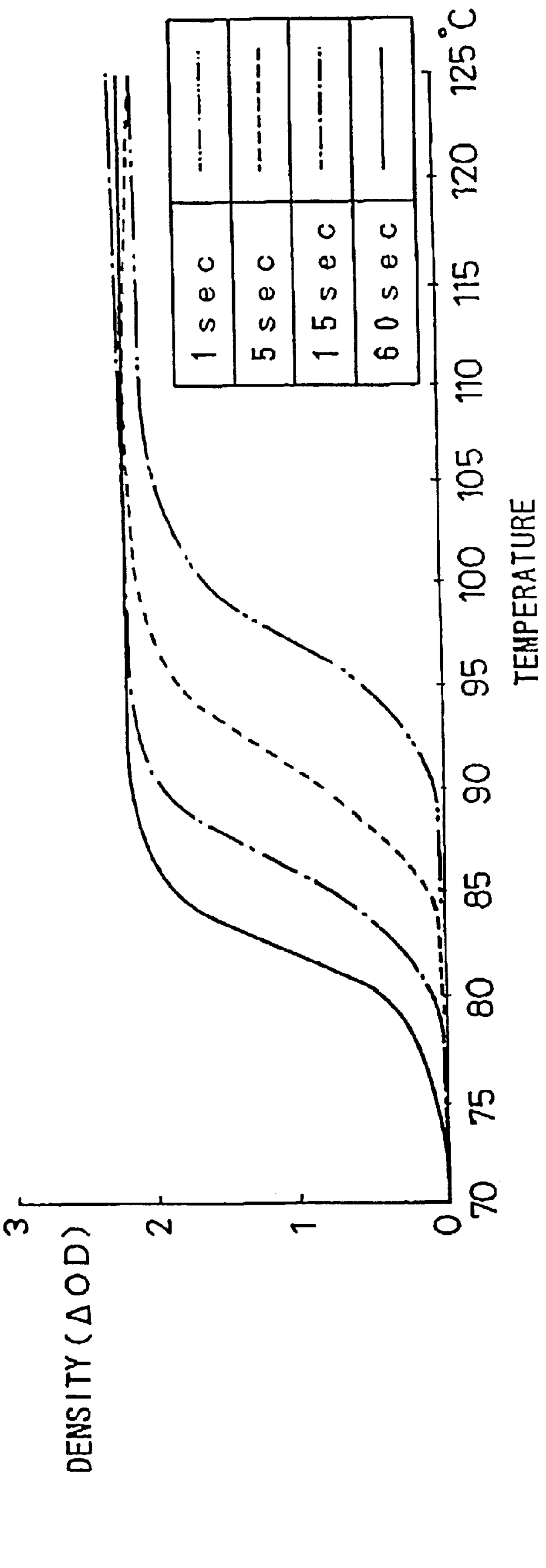
FIG. 28 is a diagram showing density characteristics of a thermosensitive recording medium with respect to the temperature and time.

The thermosensitive recording medium S used in the above-described embodiments develops color in response to thermal energy applied thereto, particularly to a function of a preheat temperature and a preheat time. FIG. 28 shows the density characteristics with respect to the temperature and time. As understood from FIG. 28, there are two ways of developing color on the thermosensitive recording medium S, either of which is usable: with an elevated temperature for a constant time; and with an elongated time at a constant temperature.

Figure 29:
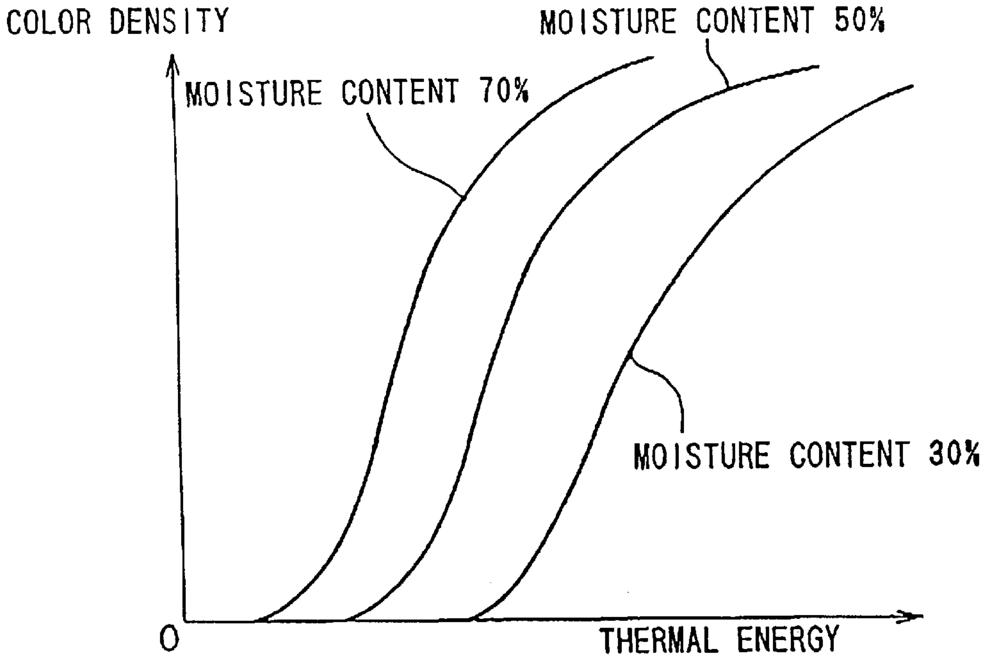
FIG. 29 is a diagram showing the relationship between the density of color develop ed on a thermosensitive recording medium with respect to thermal energy given under various moisture content in the thermosensitive recording medium.

The density of color developed on a thermosensitive recording medium S also depends on the moisture content therein. The relationships between the applied thermal energy and the density of color developed under various moisture content values are illustrated in FIG. 29. As understood from FIG. 29, the sensitivity of a thermosensitive recording medium S is enhanced as the moisture content increases. Thus, it is preferable to adjust thermal energy to be applied to the thermosensitive recording medium S depending on the moisture content therein.

Herein, the thermosensitive recording media used in the above-described embodiments is one employing microcapsules. In this case, the capsule walls of the microcapsules have a certain phase transition temperature, below which the uncolored condition of the media is maintained. On the other hand, the solid state property of the capsules after application of thermal energy, due to plasticization from the developing agent which has permeated into the microcapsules, results in a phase transition temperature which is irreversibly lowered.

Accordingly, after image recording by the thermal head, when post-recording heat application is undertaken for a sufficient period of time and at a thermal energy below that required for imparting further color (i.e. a thermal energy which, with respect to the microcapsules which have not been color-developed, is a temperature below their phase transition temperature, and with respect to the microcapsules which have been color-developed, is a temperature above their phase transition temperature for promoting a reactive effect), the developing agent permeability of only the microcapsules having the lowered phase transition temperature is raised to its saturation point, and thereafter becomes stabilized. As a result, stability over time, as well as thermal stability, of the formed image density is achieved.

Further, this kind of characteristic is not limited only to thermosensitive recording media which make use of microcapsules, but can generally be applied to any thermosensitive transfer media by which a non-color developed condition can be maintained by exploiting its phase transition temperature. For example, in the case of an organic silver-salt type media, the melting point of behenic acid silver is suitable for the phase transition temperature. Further, in the case of ordinary lueko or diazo type thermal recording media, the melting point of the coloring agent or the developing agent may be used as the phase transition temperature. Accordingly, such other types of thermal recording media can also be applied using the principles of the present invention.

Below, experimental examples showing the effects of stabilization of the image density by means of post-recording heat processing are provided.

Figure 30:
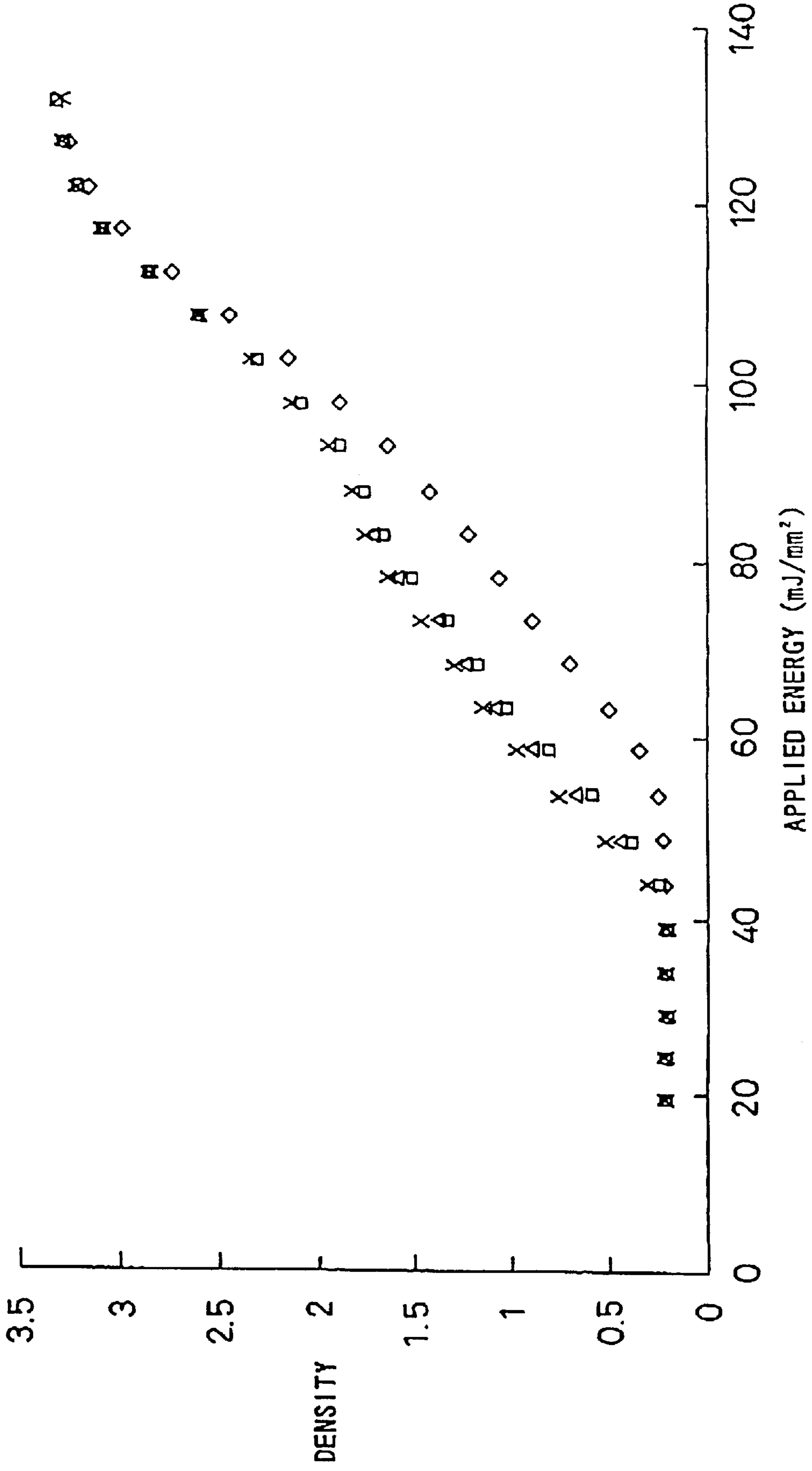
FIG. 30 is a graph describing experimental results of a post-recording heat processing, using a contact-type condition of heat application.

FIG. 30 illustrates the respective effects, after an image was thermally recorded onto a thermally sensitive recording media employing microcapsules, wherein no post-recording heat processing was performed (as shown by the ◇ symbol), wherein heat processing was conducted once using a 30 mm diameter heat roller placed in contact with the media at a temperature of 108° C. and a transport speed of 3.6 mm/sec. (shown by the □ symbol), wherein post-recording heat processing was performed a second time under the same conditions (shown by the Δ symbol), and wherein post-recording heat processing was performed a third time under the same conditions (shown by the X symbol). In this case, the image density was raised by performing the post-recording heat processing with the roller in contact with the recording media, and from this figure it is understood that the image density became saturated and stabilized, irrespective of the number of times that post-recording heat processing was performed.

Figure 31:
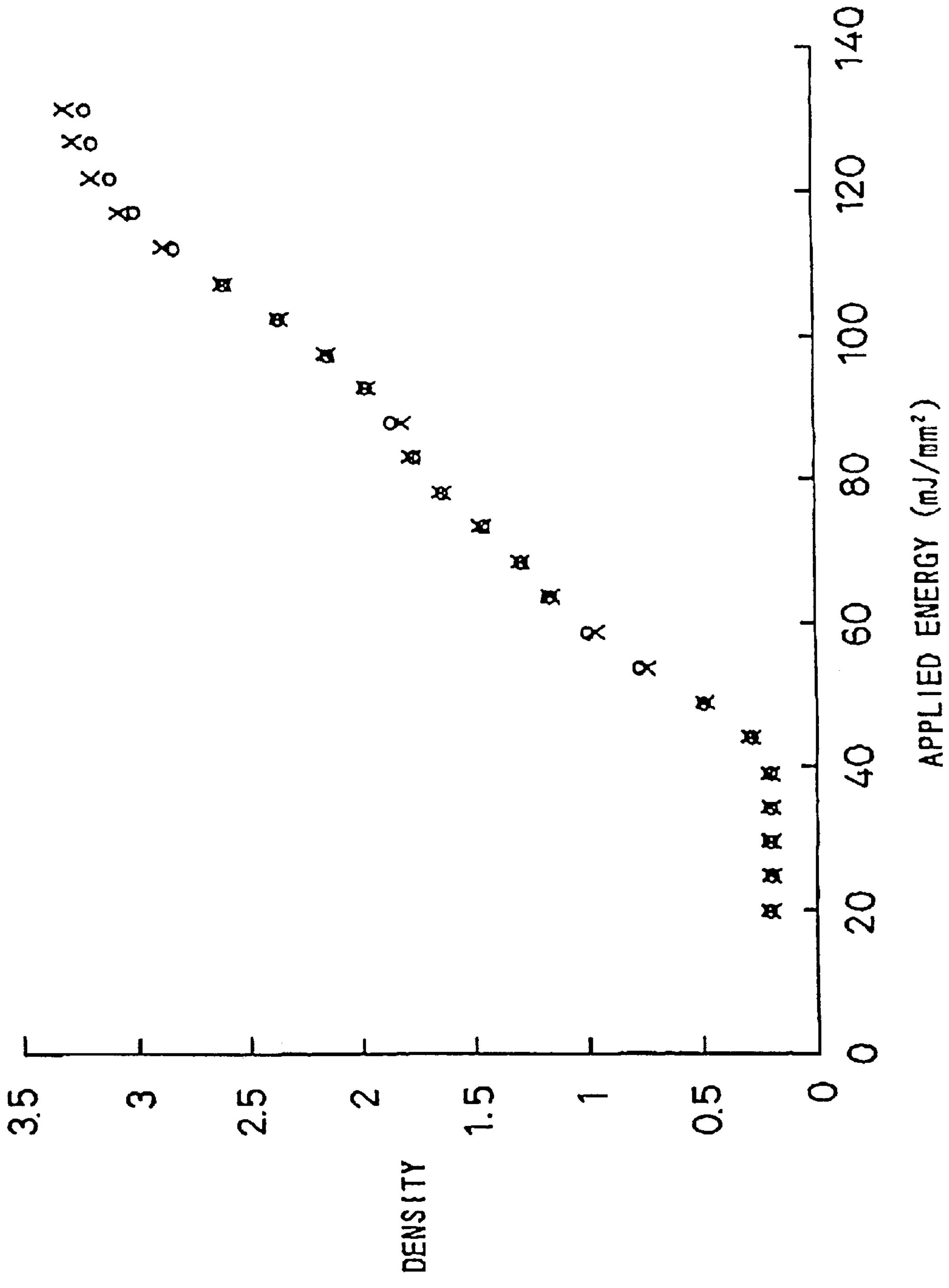
FIG. 31 is a graph describing the results of maintaining an applied heating-drying condition, after post-recording heat processing, using a contact-type condition of heat application.

FIG. 31 shows the effect of maintaining the thermosensitive recording medium, which was subjected to post-recording thermal processing corresponding to the symbol X of FIG. 30, at a temperature of 70° C. and humidity of 15%, for 1 hour. As understood from the ○ symbol in this figure, using the thermosensitive material subjected to post-recording heat processing, even when kept in a dry high temperature environment, the change in image density was suppressed to be extremely small.

Figure 32:
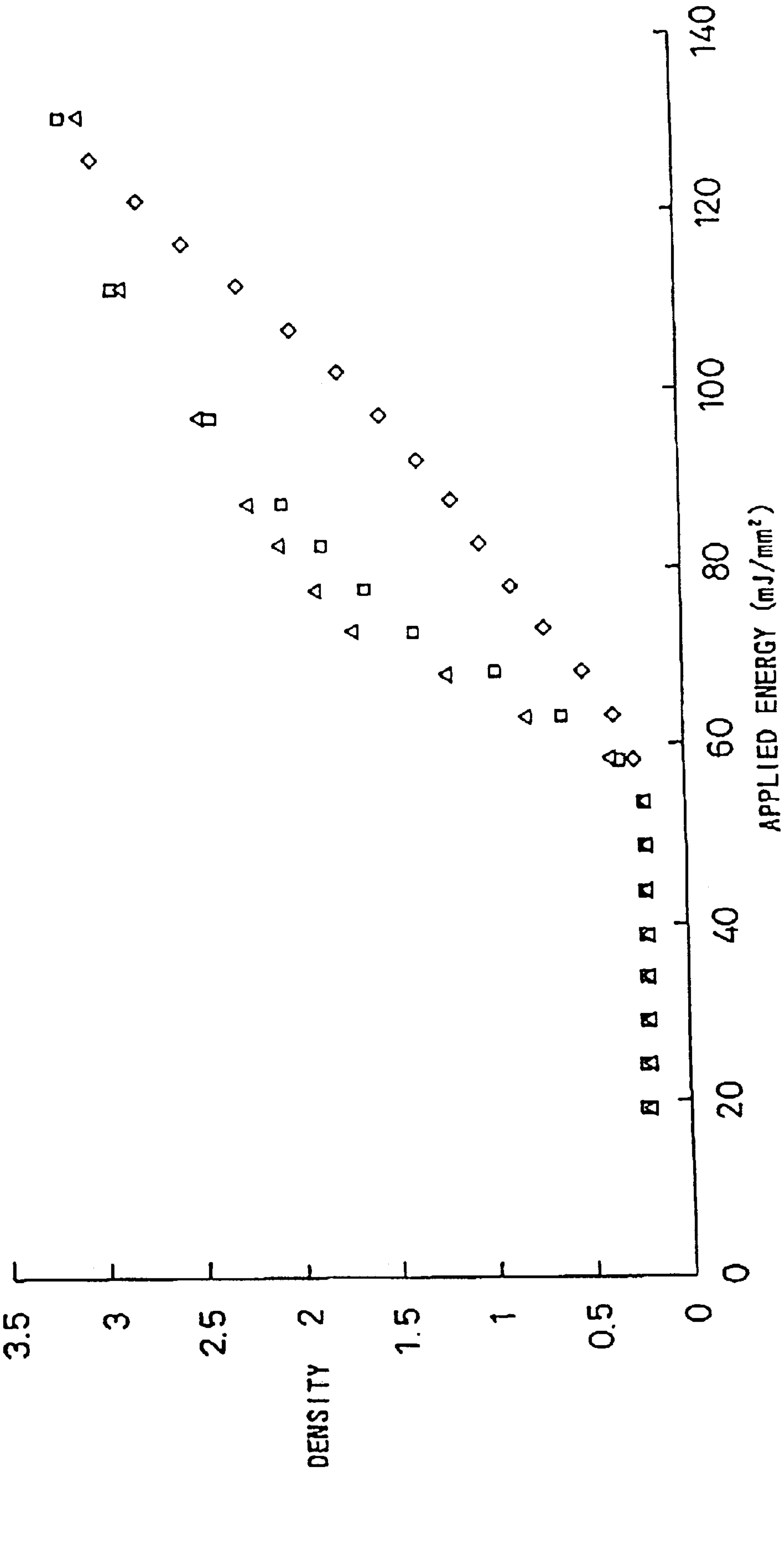
FIG. 32 is a graph describing experimental results of a post-recording heat processing, using a non-contact condition of heat application.

FIG. 32 shows the respective effects, after thermal recording of an image on a thermosensitive recording medium, in which no post-recording processing was performed (as shown by the ◇ symbol), wherein post-recording heat processing was conducted with rays from a halogen lamp radiated for 60 seconds, and wherein post-recording heat processing was conducted with rays from a halogen lamp radiated for 120 seconds (shown by the Δ symbol). In this case, the image density was raised by performing the post-recording heat processing in a non-contacting state with the recording media, and from this figure it is understood that the image density became saturated and stabilized irrespective of the length of time that the post-recording heat processing rays were irradiated.

Figure 33:
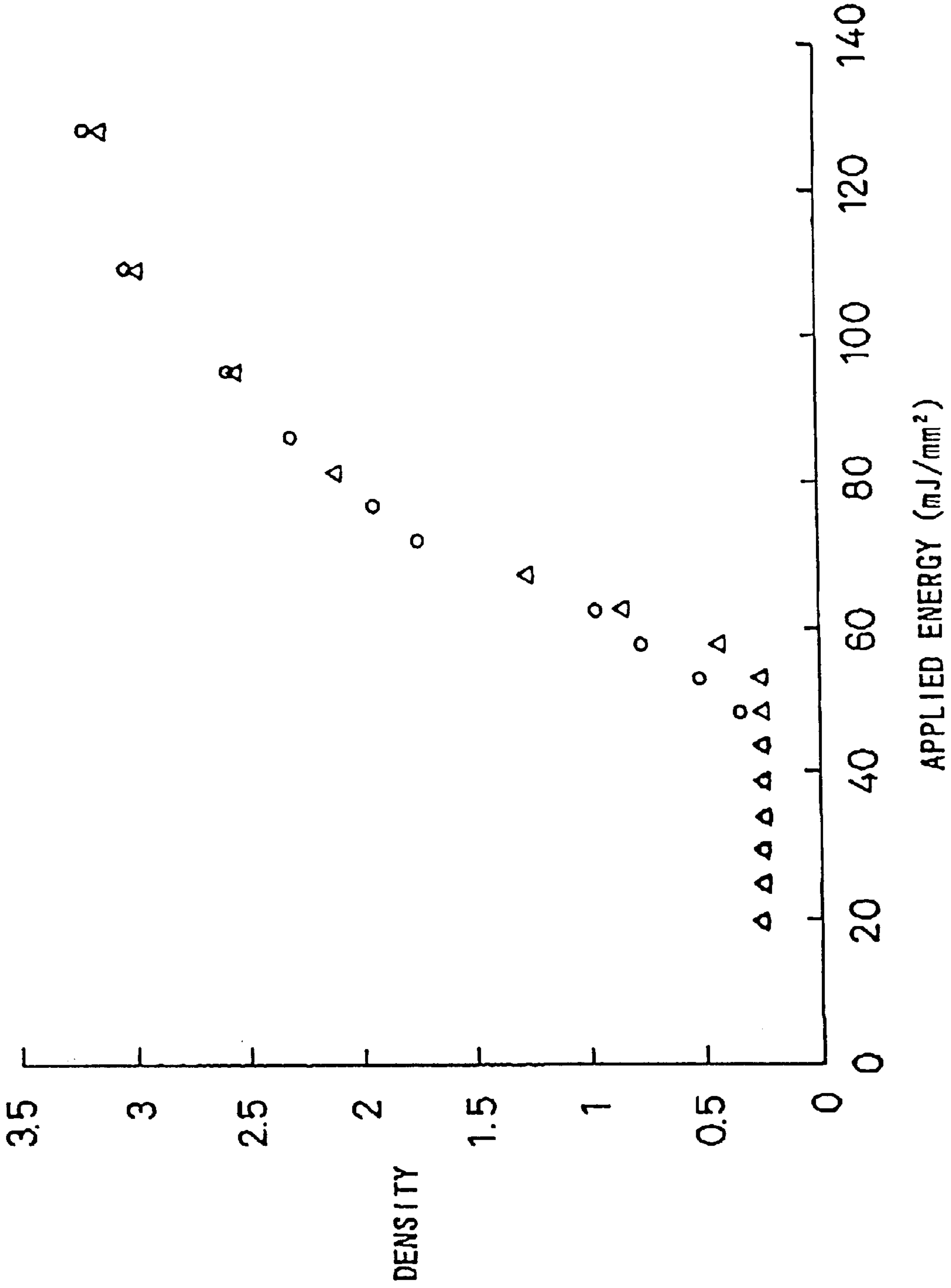
FIG. 33 is a graph describing the results of maintaining an applied heating-drying condition, after post-recording heat processing, using a non-contact condition heat application.

FIG. 33 shows the effect of maintaining the thermosensitive recording medium, which was subjected to post-recording thermal processing corresponding to the symbol Δ of FIG. 31, at a temperature of 70° C. and humidity of 15%, for 1 hour. As understood from the ○ symbol in this figure, using the thermosensitive material subjected to post-recording heat processing, even when kept in a dry high temperature environment, the change in image density was suppressed to be extremely small.

Although certain preferred embodiments of the present invention has been shown and described in detail, it should be understood that various changes and modifications may be made therein without departing from the scope of the appended claims.

What is claimed is:

1. A method of thermally recording an image on a thermosensitive recording medium which produces color with a density depending on thermal energy applied thereto, comprising the steps of:

thermally recording an image on the thermosensitive recording medium with a thermal head which generates heat according to information of the image to be recorded; and applying a quantity of post recording thermal energy uniformly over an entire surface of the thermosensitive recording medium on which the image has been recorded, such that thermal energy is absorbed uniformly by said recording medium, said quantity of thermal energy being less than a thermal recording energy needed to impart a color change to the thermosensitive recording medium, wherein said thermosensitive recording medium comprises a material which undergoes a phase transition upon application of heat thereto at an initial phase transition temperature thereby causing said color change, and in which after thermally recording said image thereon, a phase transition temperature of image recorded regions of said thermosensitive recording medium is lower than said initial phase transition temperature.

2. A method according to claim 1, further comprising the step of applying fixing light to the thermosensitive recording medium to fix the image recorded thereon after said recording step, and after applying the quantity of thermal energy to the thermosensitive recording medium.

3. A method according to claim 1, further comprising the steps of;

preheating said recording medium by applying a quantity of thermal energy uniformly over the entire surface of said medium, said quantity being less than the energy needed to impart a color change to said medium;

applying fixing light to the thermosensitive recording medium after said recording step and after said energy applying step to fix the image recorded thereon.

4. The method of claim 1, wherein said thermosensitive medium comprises a medium containing microcapsules, and which is responsive to heating.

5. A method of thermally recording an image on a thermosensitive recording medium which produces color with a density depending on thermal energy applied thereto, comprising the steps of:

preheating the thermosensitive recording medium by applying uniformly over an entire surface of said thermosensitive recording medium a quantity of thermal energy less than a thermal energy needed to impart a color change to the thermosensitive recording medium;

thermally recording an image on the preheated thermosensitive recording medium with a thermal head which generates heat according to information of the image to be recorded; and applying a quantity of post recording thermal energy uniformly over the entire surface of the thermosensitive recording medium on which the information has been recorded, such that thermal energy is absorbed uniformly by said recording medium, said quantity of post recording thermal energy being less than the thermal energy needed to impart a color change to the thermosensitive recording medium, wherein said thermosensitive recording medium comprises a material which undergoes a phase transition upon application of heat thereto at an initial phase transition temperature thereby causing said color change, and in which after thermally recording said image thereon, a phase transition temperature of image recorded regions of said thermosensitive recording medium is lower than said initial phase transition temperature.

6. The method of claim 5, wherein said thermosensitive medium comprises a medium containing microcapsules, and which is responsive to heating.

7. An apparatus for thermally recording an image on a thermosensitive recording medium which produces color with a density depending on thermal energy applied thereto, comprising:

a thermal head which generates heat according to information of an image to be recorded for thermally recording the image on the thermosensitive recording medium; and post-recording heating means for applying uniformly over an entire surface of said recording medium a quantity of post recording thermal energy less than a thermal energy needed to impart a color change to the thermosensitive recording medium, after said thermal head records the image, such that thermal energy is absorbed uniformly by said recording medium, and, wherein said thermosensitive recording medium comprises a material which undergoes a phase transition upon application of heat thereto at an initial phase transition temperature thereby causing said color change, and in which after thermally recording said image thereon, a phase transition temperature of image recorded regions of said thermosensitive recording medium is lower than said initial phase transition temperature.

8. An apparatus according to claim 7, wherein said thermal head comprises means for recording an image in multiple gradations on the thermosensitive recording medium.

9. An apparatus according to claim 7, wherein said post-recording heating means comprises:

heating means for heating said thermosensitive recording medium;

temperature detecting means for detecting a temperature to which said thermosensitive recording medium has been heated by said heating means; and temperature control means responsive to said temperature detecting means for controlling said heating means such that the temperature detected by said temperature detecting means equals a predetermined temperature.

10. An apparatus according to claim 7, wherein said post-recording heating means comprises means for heating said thermosensitive recording medium, wherein said means and said recording medium do not contact each other and wherein said means is in a position proximate to where said thermal head heats said recording medium.

11. An apparatus according to claim 7, wherein said post-recording heating means comprises means for heating said thermosensitive recording medium, wherein said means and said recording medium contact each other and wherein said means is in a position proximate to where said thermal head heats said recording medium.

12. An apparatus according to claim 11, wherein said thermal head comprises means for recording an image in multiple gradations on the thermosensitive recording medium.

13. An apparatus according to claim 11, wherein said post-recording heating means comprises:

heating means for heating said thermosensitive recording medium;

temperature detecting means for detecting a temperature to which said thermosensitive recording medium has been heated; and temperature control means responsive to said temperature detecting means for controlling said heating means such that the temperature detected by said temperature detecting means substantially equals a predetermined temperature.

14. The apparatus of claim 7, wherein said thermosensitive medium comprises a medium containing microcapsules, and which is responsive to heating.

15. An apparatus for thermally recording an image on a thermosensitive recording medium which produces color with a density depending on thermal energy applied thereto, comprising:

preheating means for applying uniformly over an entire surface of said recording medium a quantity of thermal energy less than a thermal energy needed to impart a color change to the thermosensitive recording medium;

a thermal head which generates heat according to information of an image to be recorded for thermally recording the image on the thermosensitive recording medium; and post-recording heating means for applying uniformly over the entire surface of said recording medium a quantity of thermal energy less than the thermal energy needed to impart a color change to the thermosensitive recording medium, after said thermal head records the image, such that thermal energy is absorbed uniformly by said recording medium, and wherein said thermosensitive recording medium comprises a material which undergoes a phase transition upon application of heat thereto at an initial phase transition temperature thereby causing said color change, and in which after thermally recording said image thereon, a phase transition temperature of image recorded regions of said thermosensitive recording medium is lower than said initial phase transition temperature.

16. The apparatus of claim 15, wherein said thermosensitive medium comprises a medium containing microcapsules, and which is responsive to heating.

17. An apparatus for thermally recording an image on a thermosensitive recording medium which includes a thermosensitive layer for producing color with a density depending on thermal energy applied thereto and an electrically conductive heating layer, said apparatus comprising:

a thermal head which generates heat according to information of an image to be recorded for thermally recording the image on the thermosensitive recording medium; and post-recording heating means for applying uniformly over an entire surface of said recording medium a quantity of thermal energy less than a thermal energy needed to impart a color change to the thermosensitive recording medium by supplying an electric current to said electrically conductive heating layer of the thermosensitive recording medium, after said thermal head records the image, such that a quantity of thermal energy is absorbed uniformly by said recording medium, and wherein said thermosensitive recording medium comprises a material which undergoes a phase transition upon application of heat thereto at an initial phase transition temperature thereby causing said color change, and in which after thermally recording said image thereon, a phase transition temperature of image recorded regions of said thermosensitive recording medium is lower than said initial phase transition temperature.

18. An apparatus according to claim 17, wherein said thermal head comprises means for recording an image in multiple gradations on the thermosensitive recording medium.

19. An apparatus according to claim 17, wherein said post-recording heating means comprises;

temperature detecting means for detecting a temperature to which said thermosensitive recording medium has been heated by said heating means; and temperature control means responsive to said temperature detecting means for controlling said heating means such that the temperature detected by said temperature detecting means equals a predetermined temperature.

20. The apparatus of claim 17, wherein said thermosensitive medium comprises a medium containing microcapsules, and which is responsive to heating.

* * * * *